(12) United States Patent
Kim

(10) Patent No.: US 12,323,347 B2
(45) Date of Patent: *Jun. 3, 2025

(54) IDENTIFICATION OF PACKET TRAFFIC TRANSMITTED BY VARIOUS DEVICES OPERATED IN MULTIPLE OVERLAPPED FREQUENCY BANDS IN PACKET-BASED OFDM SYSTEMS

(71) Applicant: APPLIED TRANSFORM, LLC, Bedford, MA (US)

(72) Inventor: Joon Bae Kim, Lexington, MA (US)

(73) Assignee: APPLIED TRANSFORM, LLC, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,955

(22) Filed: Jun. 30, 2023

(65) Prior Publication Data

US 2023/0344573 A1    Oct. 26, 2023

Related U.S. Application Data

(63) Continuation of application No. 17/337,883, filed on Jun. 3, 2021, now Pat. No. 11,736,247, which is a
(Continued)

(51) Int. Cl.
*H04L 5/00* (2006.01)
*H04L 1/00* (2006.01)
(Continued)

(52) U.S. Cl.
CPC .......... *H04L 5/0044* (2013.01); *H04L 1/0042* (2013.01); *H04L 1/0056* (2013.01);
(Continued)

(58) Field of Classification Search
CPC ... H04L 5/0044; H04L 5/0007; H04L 5/0053; H04L 5/0092; H04W 72/04
See application file for complete search history.

(56) References Cited

U.S. PATENT DOCUMENTS 5,144,304 A    9/1992  McMahon
5,491,719 A    2/1996  Sellin et al.
(Continued)

FOREIGN PATENT DOCUMENTS

CN    1463563    12/2003
CN    1500333    5/2004
(Continued)

OTHER PUBLICATIONS

CCSDS: The Consultative Committee for Space Data Systems, "Research and Development for Space Data System Standards, DVB-S2 Coding & Modulation Standard Use for High Data Rate TM Links," Experimental Specification, CCSDS 131.3-O-1, Jun. 2007, pp. 1-40.
(Continued)

*Primary Examiner* — Mohammad S Anwar
(74) *Attorney, Agent, or Firm* — Jason H. Vick; Amped IP LLC

(57) ABSTRACT

Techniques for header encoding include encoding a plurality of bits using a forward error correction code, generating an FEC codeword comprising a plurality of encoded bits, and concatenating a first copy of the FEC codeword with a second copy of the FEC codeword, wherein the concatenating comprises cyclically shifting by two bits the second concatenated copy of the FEC codeword relative to the first concatenated copy of the FEC codeword, wherein the encoded bits of the first and second copies of the FEC codewords are modulated on at least one OFDM symbol. techniques for header decoding include receiving a plurality of encoded bits comprising at least two concatenated copies of an FEC codeword, decoding a first copy of the FEC codeword to generate a first plurality of decoded bits, and decoding a second copy of the FEC codeword to generate a second plurality of decoded bits.

6 Claims, 19 Drawing Sheets

Related U.S. Application Data continuation of application No. 16/849,358, filed on Apr. 15, 2020, now Pat. No. 11,032,401, which is a continuation of application No. 16/145,971, filed on Sep. 28, 2018, now Pat. No. 10,637,971, which is a continuation of application No. 15/468,903, filed on Mar. 24, 2017, now Pat. No. 10,091,337, which is a continuation of application No. 15/148,216, filed on May 6, 2016, now Pat. No. 9,609,092, which is a continuation of application No. 12/783,903, filed on May 20, 2010, now Pat. No. 9,363,121, which is a continuation of application No. 12/743,876, filed as application No. PCT/US2009/054915 on Aug. 25, 2009, now Pat. No. 8,537,796.

(60) Provisional application No. 61/091,621, filed on Aug. 25, 2008, provisional application No. 61/196,068, filed on Oct. 14, 2008.

(51) Int. Cl.
| | |
|---|---|
| H04L 1/04 | (2006.01) |
| H04L 1/08 | (2006.01) |
| H04L 27/26 | (2006.01) |
| H04L 45/74 | (2022.01) |
| H04L 69/22 | (2022.01) |
| H04W 72/04 | (2023.01) |
| H04W 72/0446 | (2023.01) |
| H04W 72/0453 | (2023.01) |
| H04W 84/12 | (2009.01) |

(52) U.S. Cl.
CPC ............ *H04L 1/0072* (2013.01); *H04L 1/04* (2013.01); *H04L 1/08* (2013.01); *H04L 5/0007* (2013.01); *H04L 5/0037* (2013.01); *H04L 5/0053* (2013.01); *H04L 5/0091* (2013.01); *H04L 27/2602* (2013.01); *H04L 45/74* (2013.01); *H04L 69/22* (2013.01); *H04W 72/04* (2013.01); *H04W 72/0446* (2013.01); *H04W 72/0453* (2013.01); *H04L 27/26025* (2021.01); *H04W 84/12* (2013.01)

(56) References Cited

U.S. PATENT DOCUMENTS

| | | | |
|---|---|---|---|
| 6,499,128 | B1 | 12/2002 | Gerlach et al. |
| 6,865,164 | B1 | 3/2005 | Scribano et al. |
| 6,928,602 | B2 | 8/2005 | Yamagishi et al. |
| 6,987,754 | B2 | 1/2006 | Shahar et al. |
| 7,298,692 | B2 | 11/2007 | Hiramatsu et al. |
| 7,339,882 | B2 | 3/2008 | Schaefer et al. |
| 7,522,514 | B2 | 4/2009 | Tzannes et al. |
| 7,542,504 | B2 | 6/2009 | Chang et al. |
| 7,570,696 | B2 | 8/2009 | Maltsev et al. |
| 7,860,128 | B2 | 12/2010 | Niu et al. |
| 8,537,796 | B2 | 9/2013 | Kim |
| 9,363,121 | B2 | 6/2016 | Kim |
| 9,596,327 | B2 | 3/2017 | Kim |
| 9,602,637 | B2 | 3/2017 | Kim |
| 9,609,091 | B2 | 3/2017 | Kim |
| 9,609,092 | B2 | 3/2017 | Kim |
| 10,091,337 | B2 | 10/2018 | Kim |
| 10,637,971 | B2 | 4/2020 | Kim |
| 11,032,401 | B2 | 6/2021 | Kim |
| 11,736,247 | B2 * | 8/2023 | Kim ............... H04L 69/22 370/392 |
| 2002/0001315 | A1 | 1/2002 | Tran et al. |
| 2002/0142780 | A1 | 10/2002 | Airy et al. |
| 2003/0021296 | A1 | 1/2003 | Wee et al. |
| 2004/0063438 | A1 | 4/2004 | Hsu et al. |
| 2004/0243913 | A1 * | 12/2004 | Budge ............... A61B 6/5282 714/776 |
| 2005/0129018 | A1 | 6/2005 | Casaccia et al. |
| 2005/0221784 | A1 | 10/2005 | Gomez et al. |
| 2005/0233752 | A1 | 10/2005 | Larola et al. |
| 2006/0007898 | A1 | 1/2006 | Maltsev et al. |
| 2006/0253765 | A1 | 11/2006 | Boer et al. |
| 2007/0076811 | A1 | 4/2007 | Aldana et al. |
| 2007/0082692 | A1 | 4/2007 | Tirkkonen et al. |
| 2007/0091837 | A1 | 4/2007 | Li et al. |
| 2007/0110197 | A1 | 5/2007 | Bagchi et al. |
| 2007/0211786 | A1 | 9/2007 | Shattil |
| 2008/0117996 | A1 | 5/2008 | Kim et al. |
| 2009/0067402 | A1 | 3/2009 | Forenza et al. |
| 2009/0196163 | A1 | 8/2009 | Du |
| 2009/0257396 | A1 | 10/2009 | Eliezer et al. |
| 2009/0268782 | A1 * | 10/2009 | Wang ............... H04L 25/025 375/E1.001 |
| 2021/0289061 | A1 | 9/2021 | Kim |

FOREIGN PATENT DOCUMENTS

| | | |
|---|---|---|
| CN | 1723647 | 1/2006 |
| CN | 1957546 | 5/2007 |
| CN | 101136894 | 3/2008 |
| EP | 1202515 | 5/2002 |
| EP | 1298948 | 4/2003 |
| WO | WO 2002/078280 | 10/2002 |
| WO | WO 2005/039186 | 4/2005 |
| WO | WO 2007/063514 | 6/2007 |
| WO | WO 2008/118429 | 10/2008 |

OTHER PUBLICATIONS

IEEE Standard 802.11™M-2007, "Part 11: Wireless LAN Medium Access Control (MAC) and Physical Layer (PHY) Specifications," IEEE Computer Society, Jun. 2007, 1233 pages.

IEEE Standard 802.16™-2004, "Part 16: Air Interface for Fixed Broadband Wireless Access Systems," IEEE Computer Society and the IEEE Microwave Theory and Techniques Society, Oct. 2004, 895 pages.

Zhu et al., "Carrier Frequency Offset Estimation of OFDM Systems with Null Subcarriers" IEEE Transactions on Vehicular Technology, vol. 55, No. 5, pp. 1677-1690, Sep. 2006.

Invitation to Pay Additional Fees and, Where Applicable, Protest Fee for International (PCT) Application No. PCT/US2009/054915, mailed Sep. 9, 2010.

International Search Report for International (PCT) Patent Application No. PCT/US2009/054915, mailed Feb. 25, 2011.

Written Opinion for International (PCT) Patent Application No. PCT/US2009/054915, mailed Feb. 25, 2011.

International Preliminary Report on Patentability for International (PCT) Patent Application No. PCT/US2009/054915, mailed Mar. 31, 2011.

Official Action for Chinese Patent Application No. 200980142473.2, mailed Jun. 3, 2013.

Official Action (including translation) for Chinese Patent Application No. 200980142473.2, mailed Mar. 14, 2014.

Official Action (including translation) for Chinese Patent Application No. 200980142473.2, mailed Sep. 24, 2014.

Decision of Rejection (including translation) for Chinese Patent Application No. 200980142473.2, mailed Jun. 10, 2015.

Notification to Grant the Patent Right for Invention (including translation) for Chinese Patent Application No. 200980142473.2, mailed Feb. 16, 2016.

Official Action (including translation) for Chinese Patent Application No. 201610282329.0, mailed Jul. 25, 2018.

Official Action (including translation) for Chinese Patent Application No. 201610282329.0, mailed Mar. 7, 2019.

Official Action (including translation) for Chinese Patent Application No. 201610282329.0, mailed Dec. 6, 2019.

Office Action for European Patent Application No. 09791896.5, mailed Feb. 13, 2012.

Office Action for European Patent Application No. 09791896.5, mailed Oct. 25, 2012.

(56) References Cited

OTHER PUBLICATIONS

Communication Under Rule 71(3) EPC—Intention to Grant for European Patent Application No. 09791896.5, mailed Jul. 23, 2013.
Decision to Grant a European Patent Pursuant to Article 97(1) EPC for European Patent Application No. 09791896.5, mailed Dec. 19, 2013.
European Search Report for European Application No. 14000108.2, mailed Mar. 6, 2014.
Communication Pursuant to Rule 69 EPC for European Application No. 14000108.2, mailed Apr. 23, 2014.
Office Action for European Application No. 14000108.2, mailed May 10, 2016.
Office Action for European Application No. 14000108.2, mailed Mar. 28, 2017.
Intent to Grant for European Application No. 14000108.2, mailed Mar. 5, 2018.
Office Action for U.S. Appl. No. 12/743,876, mailed Oct. 9, 2012.
Office Action for U.S. Appl. No. 12/743,876, mailed Apr. 18, 2013.
Notice of Allowance for U.S. Appl. No. 12/743,876, mailed Jun. 14, 2013.
Office Action for U.S. Appl. No. 12/783,903, mailed Jul. 23, 2012.
Office Action for U.S. Appl. No. 12/783,903, mailed Feb. 22, 2013.
Office Action for U.S. Appl. No. 12/783,903, mailed Apr. 23, 2014.
Office Action for U.S. Appl. No. 12/783,903 mailed Dec. 4, 2014.
Office Action for U.S. Appl. No. 12/783,903 mailed Aug. 26, 2015.
Notice of Allowance for U.S. Appl. No. 12/783,903 mailed Apr. 13, 2016.
Office Action for U.S. Appl. No. 15/148,141 mailed Sep. 8, 2016.
Notice of Allowance for U.S. Appl. No. 15/148,141 mailed Jan. 12, 2017.
Office Action for U.S. Appl. No. 15/148,164 mailed Sep. 15, 2016.
Notice of Allowance for U.S. Appl. No. 15/148,164 mailed Feb. 8, 2017.
Office Action for U.S. Appl. No. 15/148,186 mailed Sep. 9, 2016.
Notice of Allowance for U.S. Appl. No. 15/148,186 mailed Jan. 20, 2017.
Office Action for U.S. Appl. No. 15/148,216 mailed Sep. 23, 2016.
Notice of Allowance for U.S. Appl. No. 15/148,216 mailed Feb. 14, 2017.
Office Action for U.S. Appl. No. 15/468,903, mailed Jul. 24, 2017.
Office Action for U.S. Appl. No. 15/468,903, mailed Feb. 5, 2018.
Notice of Allowance for U.S. Appl. No. 15/468,903, mailed May 16, 2018.
Office Action for U.S. Appl. No. 16/145,971 mailed Sep. 5, 2019.
Notice of Allowance for U.S. Appl. No. 16/145,971 mailed Dec. 26, 2019.
Office Action for U.S. Appl. No. 16/849,358 mailed Sep. 21, 2020.
Office Action for U.S. Appl. No. 16/849,358 mailed Jan. 26, 2021.
Notice of Allowance for U.S. Appl. No. 16/849,358 mailed Feb. 11, 2021.
Office Action for U.S. Appl. No. 17/337,883, mailed Sep. 20, 2022.
Office Action for U.S. Appl. No. 17/337,883, mailed Jan. 31, 2023.
Office Action for U.S. Appl. No. 17/337,883, mailed Apr. 6, 2023.

\* cited by examiner

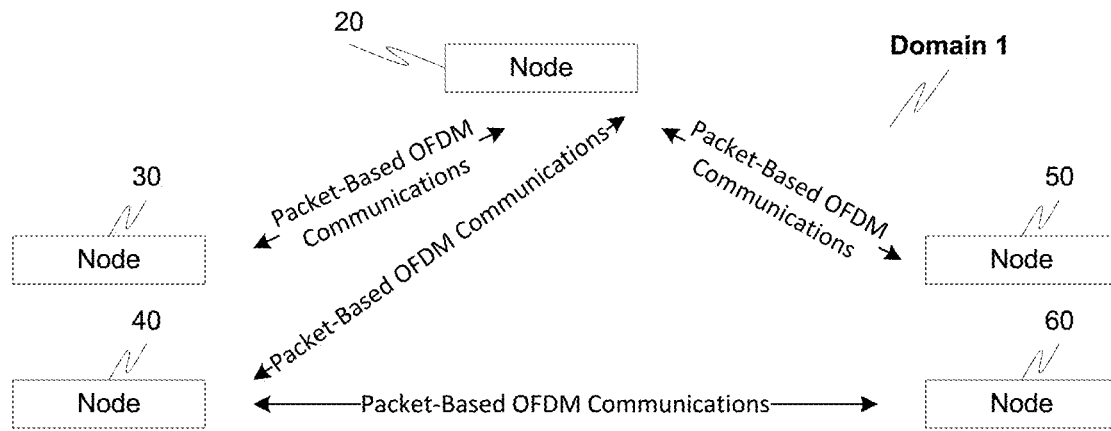
Fig. 1
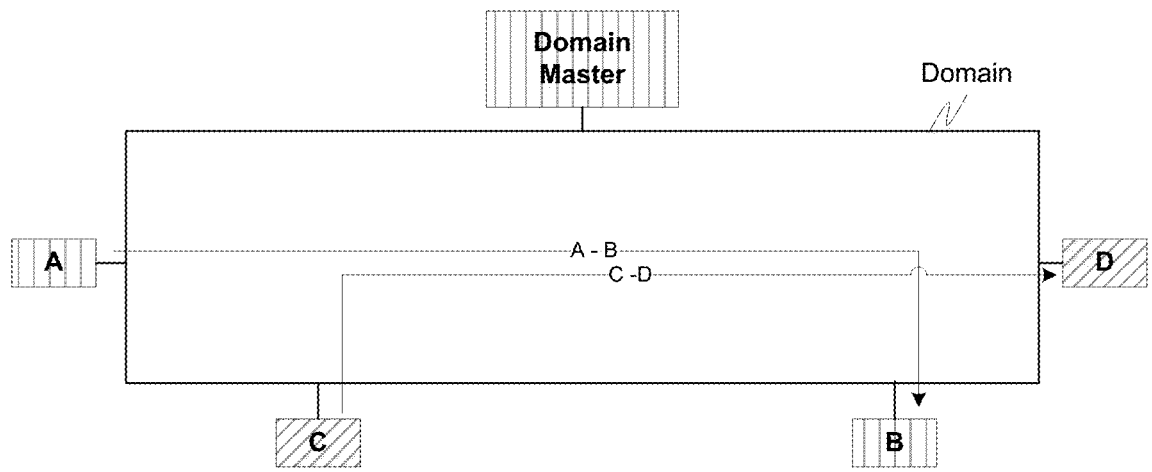
Fig. 2
 - High-Profile Device
 - Low-Profile Device Passband Low Profile Passband High Profile

IDENTIFICATION OF PACKET TRAFFIC TRANSMITTED BY VARIOUS DEVICES OPERATED IN MULTIPLE OVERLAPPED FREQUENCY BANDS IN PACKET-BASED OFDM SYSTEMS

RELATED APPLICATION DATA

This application is a Continuation of U.S. patent application Ser. No. 17/337,883, filed Jun. 3, 2021, now U.S. Pat. No. 11,736,247, which is a Continuation of U.S. patent application Ser. No. 16/849,358, filed Apr. 15 2020, now U.S. Pat. No. 11,032,401, which is a Continuation of U.S. application Ser. No. 16/145,971, filed Sep. 28, 2018, now U.S. Pat. No. 10,637,971, which is a Continuation of U.S. patent application Ser. No. 15/468,903, filed Mar. 24, 2017, now U.S. Pat. No. 10,091,337, which is a Continuation of U.S. patent application Ser. No. 15/148,216, filed May 6, 2016, now U.S. Pat. No. 9,609,092, which is a Continuation of U.S. patent application Ser. No. 12/783,903, filed May 20, 2010, now U.S. Pat. No. 9,363,121, which is a Continuation of U.S. Pat. Ser. No. 12/743,876, filed Dec. 28, 2010, now U.S. Pat. No. 8,537,796, which is a national stage application under 35 U.S.C. 371 of PCT Application No. PCT/US2009/054915 having an international filing date of Aug. 25, 2009, which designated the United States, which PCT application claims the benefit of and priority under 35 U.S.C. § 119 (e) to U.S. Patent Application Nos. 61/091,621, filed Aug. 25, 2008, entitled "Methods to Identify Packet Traffic Transmitted by Various Devices Operated in Multiple Overlapped Frequency Bands in Packet-Based OFDM Systems," and 61/196,068, filed Oct. 14, 2008, entitled "Methods to Identify Packet Traffic Transmitted by Various Devices Operated in Multiple Overlapped Frequency Bands and Packet-Based OFDM Systems," all of which are incorporated herein by reference in their entirety.

BACKGROUND

Field of the Invention

Exemplary aspects of the invention relate to communications systems. More specifically, exemplary aspects of the invention relate to communications systems where information is exchanged using packet-based transmissions based on Orthogonal Frequency Division Multiplexing (OFDM). More specifically, exemplary aspects of the invention relate to identifying packet traffic in order to support interoperability among devices operated in multiple frequency bands where packet-based transmission based on orthogonal frequency domain multiplexing is used.

Considering multi-user communication environments where two or more users communicate with one another over a shared channel, e.g., a single frequency band, using packet-based transmission based on OFDM, a packet is usually formed by a preamble, a header, and a payload, and transmitted using time-sharing or contention-based media access methods. Examples of such systems includes IEEE 802.11 (Wireless LAN) and IEEE 802.16 (WiMAX).

OFDM, also referred to as Discrete MultiTone (DMT) or multicarrier communications, divides the transmission frequency band into multiple subcarriers, also referred to as tones or subchannels, with each subcarrier individually modulating a bit or a collection of bits.

SUMMARY

As used herein, the terms transmitter, transmitting transceiver and transmitting modem are used interchangeably, similarly, the terms receiver, receiving transceiver and receiving modem are used interchangeably as well as the terms modem and transceiver being used interchangeably.

Additionally, as used herein, the following terms are defined:

Domain: A network comprising all nodes which can communicate and interfere with each other directly at the physical layer.

Domain Master (DM): A node of a domain managing (coordinating) all other nodes of the same domain (e.g., assigning bandwidth, resources and manage priorities).

Profile: A band plan which specifies OFDM modulation parameters such as the range of frequency, sub-carrier spacing, cyclic prefix, etc. There must be one or more overlapped regions between two different profiles.

High-profile device: A device operated using a profile which has a higher bandwidth relative to low-profile.

Low-profile device: A device operated using a profile which has a lower bandwidth relative to high-profile.

Fsc: Sub-carrier spacing.

N: Maximum number of sub-carriers in a profile of the bandwidth B (B=N×Fsc).

Fus: Frequency up-shift used in the definition of IDFT for baseband transmission.

Fuc: Frequency up-conversion used in the definition of IDFT for passband or Radio-Frequency (RF) transmission.

Fc: Center frequency used in the definition of IDFT for passband or RF transmission.

Fc=Fuc+Fus.

Exemplary aspects of the invention are directed toward identification of packet traffic.

Additional aspects of the invention are directed toward identification of packet traffic transmitted by various devices operated in a multiple overlapped frequency bands in packet-based OFDM environments.

Additional aspects of the invention are directed toward a domain master managing traffic amongst a plurality of devices in a domain, with all devices in a domain capable of identifying all traffic passing therethrough.

Even further aspects of the invention relate to accommodating multiple profiles within a single domain.

Additional aspects of the invention are also directed toward injecting information regarding profile (band plan) into a preamble so that a receiver can identify what profile the transmitter is operating on as part of a preamble detection process.

Even further aspects of the invention relate to bypassing a header decoding process.

Additional aspects of the invention relate to having common sub-carrier indexing for all profiles so that a high-profile device can decode a portion of sub-carriers of a low-profile device, and a low-profile device can decode a portion of sub-carriers of a high-profile device.

Additional aspects relate to enhancing the decodability of a header via sub-carrier redistribution.

Additional aspects of the invention relate to distribution of header information between preamble and non-preamble tones.

Aspects of the invention also relate to making a number of sub-carriers on which a single set of header information bits are mapped, and the ratio of the number of non-preamble tones over the number of preamble tones, be co-prime or even-odd pair.

Even further aspects of the invention relate to circular shifting of sub-carriers within each header block, for example, by changing tone mapping as a copy of the header block is repeated over the entire bandwidth.

These and other features and advantages of this invention are described in, or are apparent from, the following detail description of the exemplary embodiments.

BRIEF DESCRIPTION OF THE DRAWINGS

The exemplary embodiments of the invention will be described in detail, with reference to the following figures, wherein:

FIG. 1 illustrates an exemplary domain according to this invention;

FIG. 2 illustrates an exemplary embodiment of a domain where multiple profiles are operating according to this invention;

DETAIL DESCRIPTION

Figure 3:
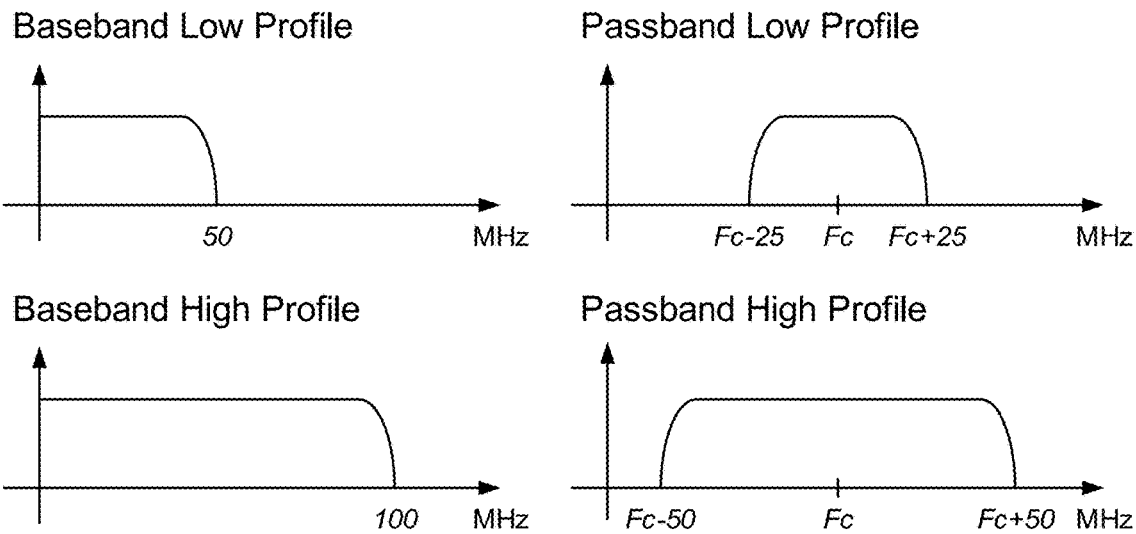
FIG. 3 illustrates an exemplary set of passband and baseband profiles according to this invention.

The exemplary embodiments of this invention will be described in relation to OFDM communications systems, as well as protocols, techniques and methods to identify packets. However, it should be appreciated, that in general, the systems and methods of this invention will work equally well for other types of communications environments and/or protocols.

The exemplary systems and methods of this invention will also be described in relation to multicarrier wired or wireless modems, such as powerline modems, coaxial cable modems, telephone line modems, such as xDSL modems and vDSL modems, wireless modems, such as 802.11 and 802.16 modems, and associated communications hardware, software and communications channels. However to avoid unnecessarily obscuring the present invention, the following description omits well-known structures and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured, and/or encrypted system. Thus, it should be appreciated that the components of the system can be combined into one or more devices, such as a modem, line card, a station, a domain master, a node or collocated on a particular node of a distributed network, such as a telecommunications network. As will be appreciated from the following description, and for reasons of computations efficiency, the components of the systems can be arranged at any location within a distributed network without affecting the operation thereof. For example, the various components can be located in a domain master, a node, a domain management device, or some combination thereof. Similarly, one or more functional portions of this system could be distributed between a modem and an associated computing device.

Furthermore, it should be appreciated that the various links, including the communications channels connecting the elements (not shown) can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute, and variations thereof, as used herein are used interchangeably and include any type of methodology, process, technique, mathematical operation or protocol. The terms transmitting modem and transmitting transceiver as well as receiving modem and receiving transceiver are also used interchangeably herein.

Moreover, while some of the exemplary embodiments described are directed toward a transmitter portion of a transceiver performing certain functions, this disclosure is intended to include corresponding receiver-side functionality in both the same transceiver and/or another transceiver and vice versa.

Certain exemplary embodiments of this invention relate to multi-carrier communications links, such as Discrete Multi-Tone (DMT). Also, the terms transceiver and modem have the same meaning and are used interchangeably.

FIG. 1 illustrates an exemplary communications environment in domain 1. The communications environment includes a plurality of nodes 20-60 that exchange packet-based OFDM communications. In FIG. 2, an example of multiple devices with two profiles operating in a single domain is shown. As an example, there can be two high-profile devices (A and B), two low-profile devices (C and D), and one domain master, which is also a high-profile device in this exemplary embodiment. One unidirectional communication link can be established between transmitter A and receiver B using a high-profile, and another unidirectional communication link can be made between transmitter C and receiver D using a low-profile. The domain master can manage traffic among these devices using both profiles. Since all devices can operate at the same time using a shared channel, they should be also able to identify all traffic passing through the domain. That is, B and D should be able to identify packets transmitted by A and C.

FIG. 3 illustrates examples of two baseband and a passband profiles where a low profile has a bandwidth of 50 MHz and a high profile has a bandwidth of 100 MHz. In order to accommodate multiple profiles within a single domain, all the devices should be able to identify the source and destination of all traffic. In order to achieve this:

1. The devices operating on different profiles should be able to detect each other's preamble.

For example, if A communicates with B, and C communicates with D in a single domain as shown in FIG. 2, then B should be able to detect preambles from A and C. The same holds true for D.

2. The devices operating on different profiles may need to decode each other's header.

For example, if A communicates with B, and C communicates with D in a single domain as shown in FIG. 2, then B may need to decode headers from A and C. The same is true for D. This is to identify the source and destination of the packet. However, this step can optionally be omitted if the device can extract information about the profile from the received preamble as discussed herein.

In accordance with an exemplary embodiment of the invention is a method to inject information regarding the profile (band plan) into a preamble so that a receiver can identify what profile the transmitter is utilizing as part of the preamble detection process. This method at least enables the receiver to bypass the header decoding process.

Figure 4:
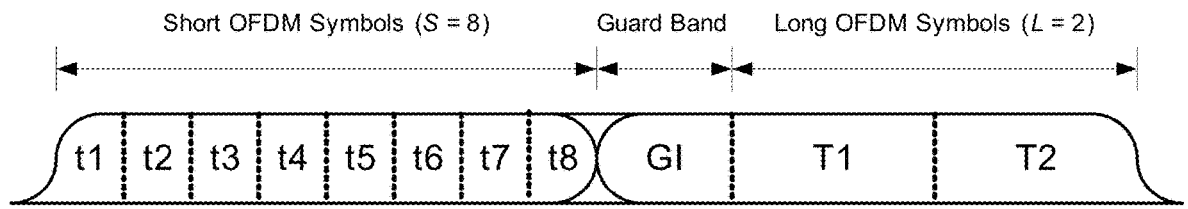
FIG. 4 illustrates an exemplary two-section preamble according to this invention.

FIG. 4 shows one example of the preamble structure used in various standards, such as IEEE 802.11. The preamble comprises S short OFDM symbols denoted by t followed by L long OFDM symbols denoted by T In FIGS. 4, S=8 and L=2 as one possible example of this structure. There is no guard interval (GI) within short (or long) symbols, but there is one between short and long symbols. The short OFDM symbols use the smaller number of sub-carriers (N1) with the larger tone spacing (k1), which results in a short time duration, whereas the long OFDM symbols use the larger number of sub-carriers (N2) with the smaller tone spacing (k2), which results in a long time duration. However, both short and long OFDM symbols cover the same frequency band (B=N1×k1=N2×k2). One should note that the same signal should be used for S short OFDM symbols (e.g., the signal becomes periodic), and the same is true for L long OFDM symbols, but short and long OFDM symbols do not necessarily have the same signal.

In accordance with one exemplary embodiment, a technique makes use of the signal of the long OFDM symbols to carry information regarding profiles. For example, if QPSK is used for all preamble symbols, then different phases can be used to represent different types of profiles. For example, the preamble shown in FIG. 4 can have distinct two-section preambles for 4 profiles:

Profile #1: t1(+, +), t2(+, +), . . . , t8(+, +), T1(+, +), T2(+, +)

Profile #2: t1(+, +), t2(+, +), . . . , t8(+, +), T1(—, +), T2(—, +)

Profile #3: t1(+, +), t2(+, +), . . . , t8(+, +), T1(—, —), T2(—, —)

Profile #4: t1(+, +), t2(+, +), . . . , t8(+, +), T1(+, —), T2(+, —)

"t1(+, +)" denotes that all tones in t1 short symbol are loaded with (+, +).

Figure 5:
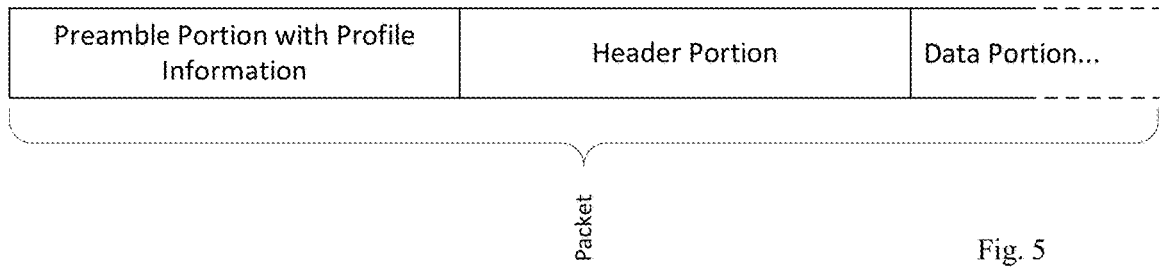
FIG. 5 illustrates an exemplary portion of a packet according to this invention.

However, the construction of the preamble as shown above and in FIG. 4 is not to be considered limiting. More broadly, and in relation to FIG. 5, a portion of a packet is shown that comprises a preamble portion with profile information as well as a header portion and a data portion—in general, the preamble can carry information about the profile. For example, the preamble portion of a packet can contain information that is transmitted by a transmitter and receiver by a receiver, wherein this information indicates which profile is being used or more generally any information about the profile being used for the transmission or reception of the packet. The method for indicating information about the packet can be, for example, based one or one or more of the following:

the phase of subcarriers in the preamble, the amplitude of subcarriers in the preamble, the subcarrier spacing of subcarriers in the preamble, the number of subcarriers in the preamble, and the indexes of transmitted subcarriers in the preamble.

Figure 6:
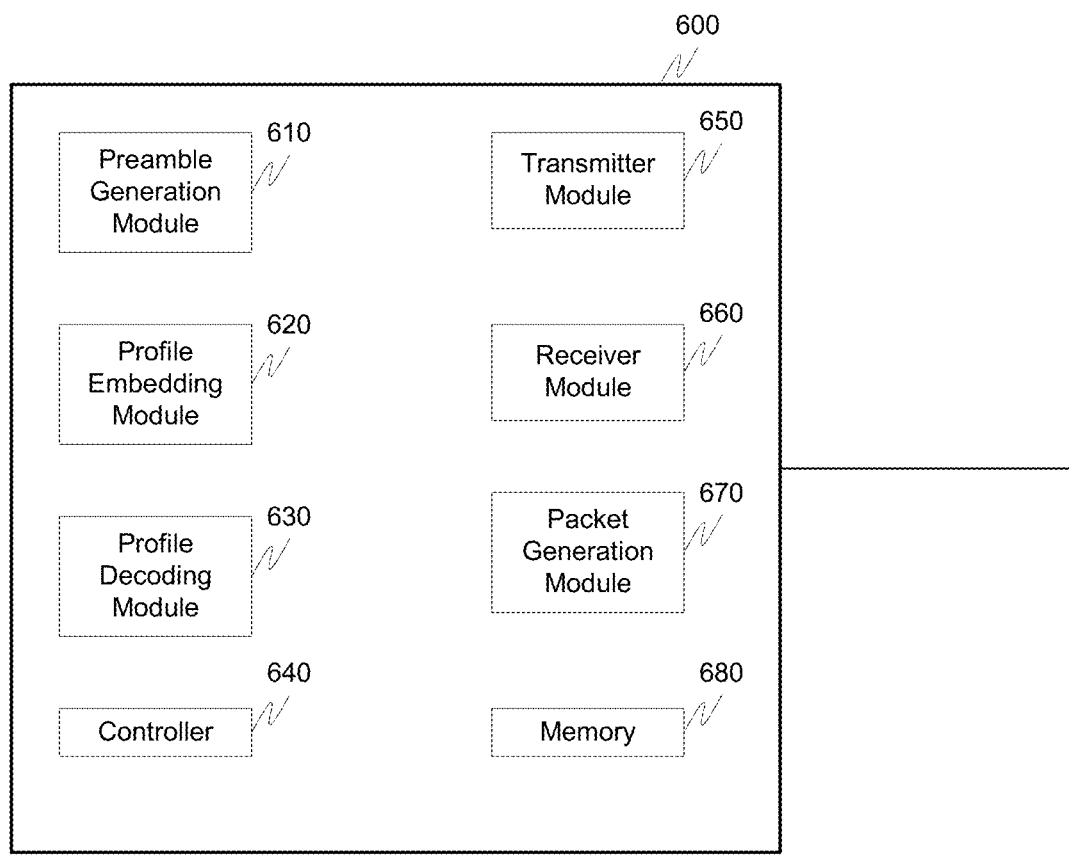
FIG. 6 illustrates an exemplary preamble generation system according to this invention.

For example, FIG. 6 illustrates an exemplary transceiver 600 according to this invention. The transceiver 600 includes a preamble generation module 610, a profile embedding module 620, a profile decoding module 630, controller 640, transmitter module 650, receiver module 660, packet generation module 670, and memory 680, as well as additional well known componentry (not shown).

In operation, for packet transmission, the packet generation module 670, cooperating with the preamble generation module 610 and profile embedding module 620, include information in the preamble representative of the profile that will be used by the transmitter module 650 for the sending of the packet. For example, as discussed above, different phases can be used to represent different types of profiles, different amplitudes of subcarriers can be used to represent different types of profiles, different subcarrier spacing of subcarriers can be used to represent different profiles, the selection of a number of subcarriers can be used to represent different types of profiles and the indexes of transmitted subcarriers can be used to represent different profiles, all being present in the preamble.

At the receiver, upon receipt of a packet that includes profile information in the preamble, the profile decoding module 630, optionally and in cooperation with controller 640 and memory 680, can decode any one or more of the above portions of the information to determine the profile used for transmission.

Figure 7:
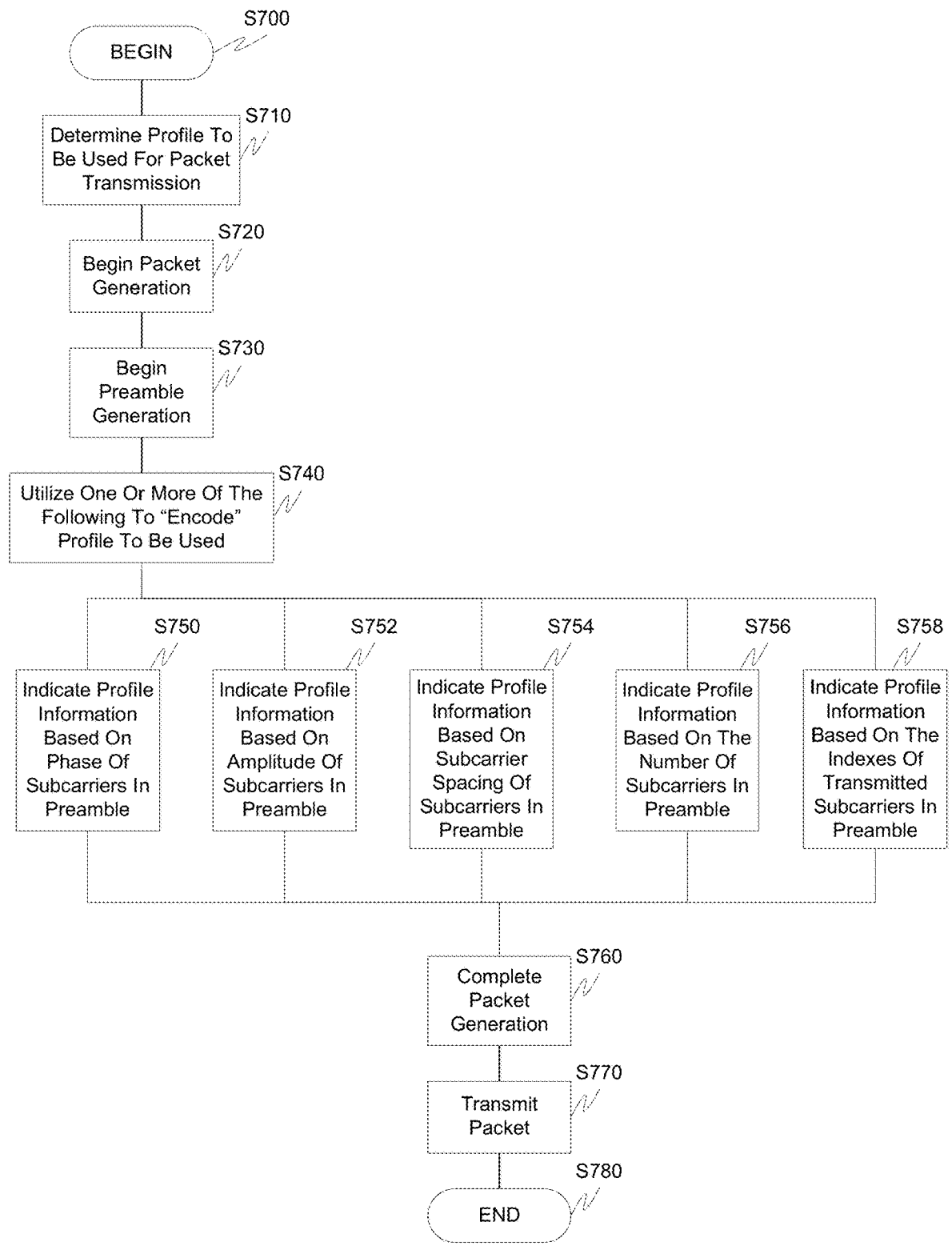
FIG. 7 illustrates a flowchart of an exemplary method for preamble assembly according to this invention.

FIG. 7 illustrates an exemplary method for embedding profile information in a packet preamble according to an exemplary embodiment of this invention. In particular, control begins in step S700 and continues to step S710. In step S710, the profile to be used for packet transmission is determined. Next, in step S720, packet generation commences. Then, in step S730, preamble generation commences. Control then continues to step S740.

In step S740, one or more of the following techniques are used to encode or otherwise indicate which profile will be used for transmission of the packet. For example, in step S750, the profile information can be indicated based on the phase of the subcarriers in the preamble. In step S752, the profile information is indicated based on the amplitude of subcarriers in the preamble. In step S754, the profile information is indicated based on subcarrier spacing of subcarriers in the preamble. In step S756, the profile information is indicated based on the number of subcarriers in the preamble. In step S758, the profile information is indicated based on the indexes of transmitted subcarriers in the preamble.

For example, information regarding each of these techniques can be stored in a table and, for example, memory 680. That way, both a transmitter and receiver will be able to correlate the technique used and the information in the preamble to a specific profile.

In step S760, packet generation is completed, with transmission of the packet occurring in step S770 and the control sequence ending in step S780.

Figure 8:
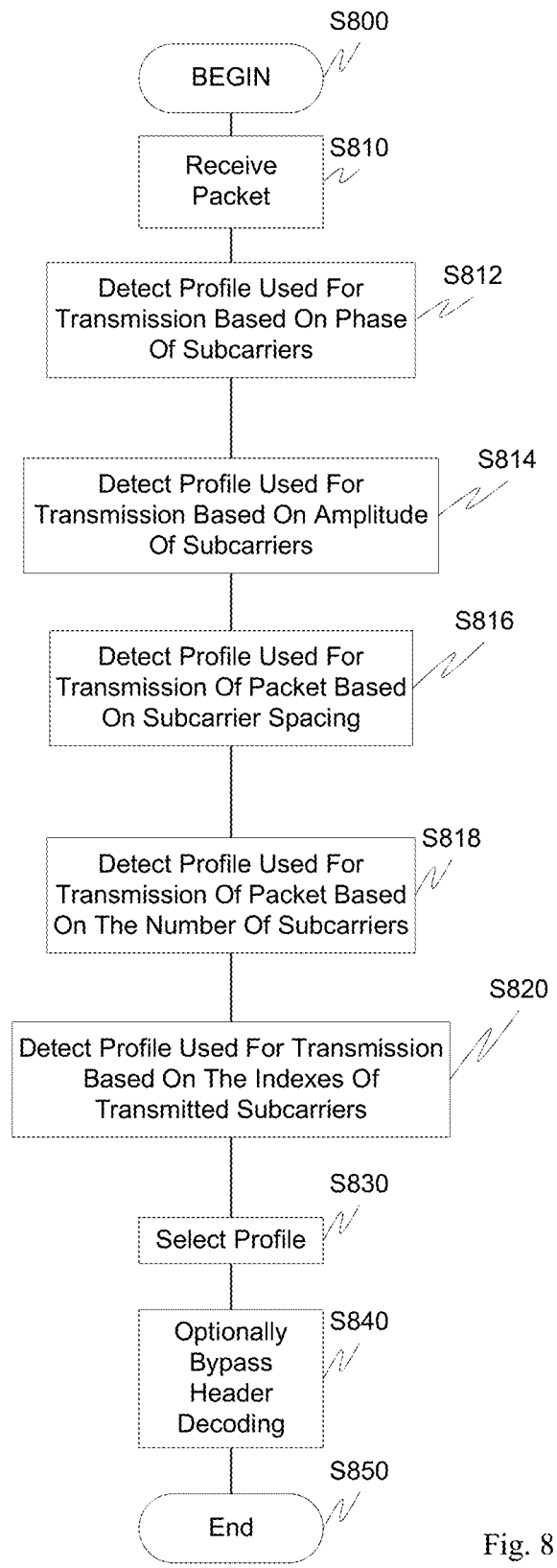
FIG. 8 illustrates a flowchart of an exemplary method for profile detection according to this invention.

FIG. 8 outlines an exemplary method for profile detection according to an exemplary embodiment of this invention. In particular, control begins in step S800 and continues to step S810. In step S810, a packet is received by a receiver. Steps S812-S819 illustrate one or more detection steps that can be performed.

In step S812, the profile used for transmission of the packet can be detected based on the phase of the subcarriers in the preamble. In step S814, the profile used for transmission of the packet can be detected based on the amplitude of subcarriers in the preamble. In step S816, the profile used for transmission of the packet can be detected based on subcarrier spacing of subcarriers in the preamble. In step S818, the profile used for transmission of the packet can be detected based on the number of subcarriers in the preamble. In step S819, the profile used for transmission of the packet can be detected based on the indexes of transmitted subcarriers in the preamble.

Then, in step S830, the profile is selected based on the detection. Control then continues to step S840.

In step S840, header decoding can optionally be bypassed, with control continuing to step S850 where the control sequence ends.

Figure 9:
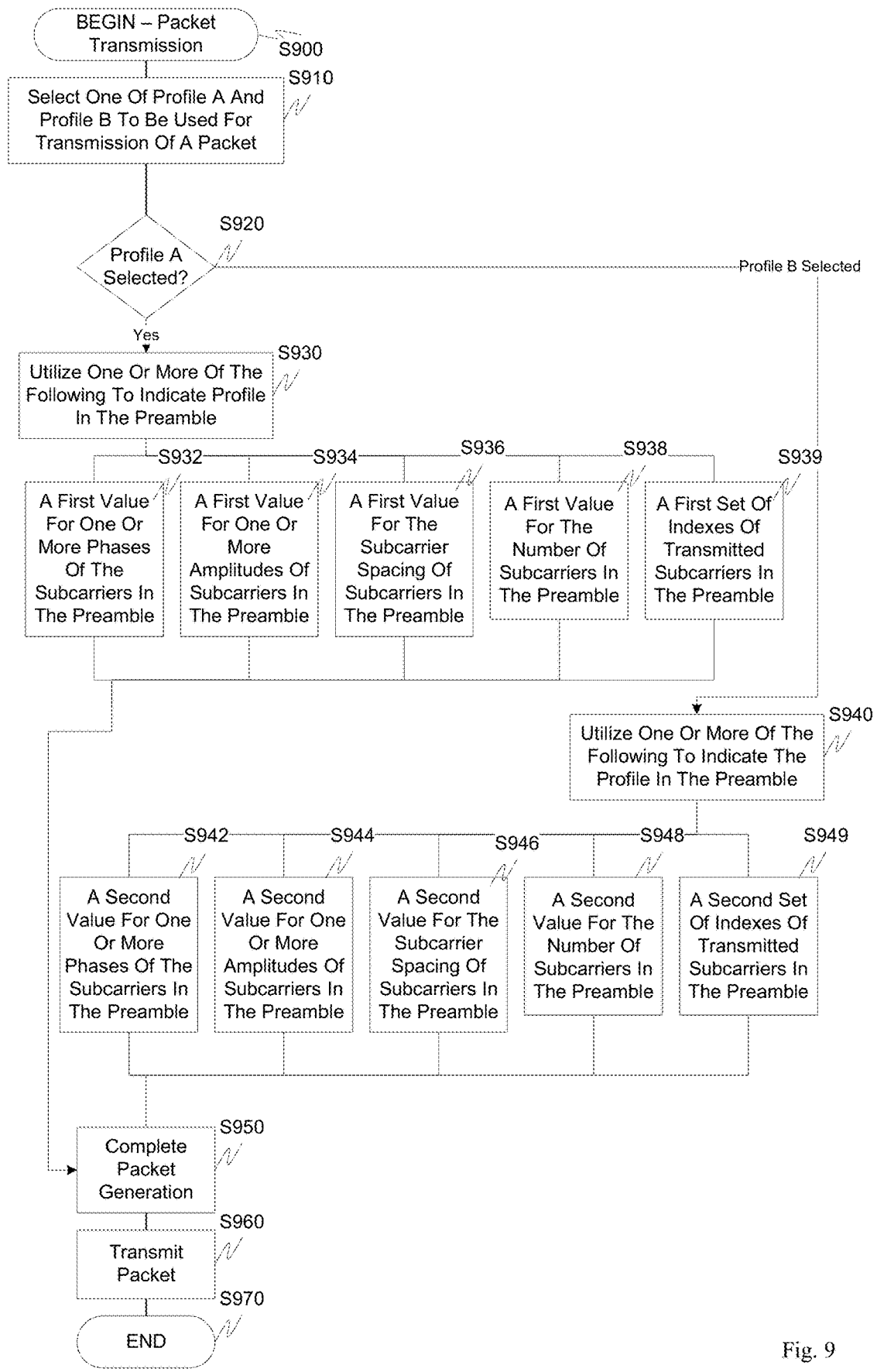
FIG. 9 illustrates a flowchart of an exemplary method for profile selection for packet transmission according to this invention.

FIG. 9 illustrates an exemplary method for packet transmission according to an exemplary embodiment of this invention. Control begins in step S900 and continues to Step S910. In step S910, one of profile A and profile B to be used for transmission of a packet is selected. Next, in step S920, a determination is made whether Profile A is to be used or Profile B. If Profile A is to be used control continues to step S930. If profile B is to be used control jumps to step S940.

In step S930, and if Profile A is selected one or more of steps S932-S939 are used to indicate the profile in the preamble:

Step S932—A first value for one or more phases of the subcarriers in the preamble, Step S934—A first value for one or more amplitudes of subcarriers in the preamble, Step S936—A first value for the subcarrier spacing of subcarriers in the preamble, Step S938—A first value for the number of subcarriers in the preamble, Step S939—A first set of indexes of transmitted subcarriers in the preamble.

In step S940, and if Profile B is selected, one or more of steps S942-S949 are used to indicate the profile in the preamble:

Step S942—A second value for one or more phases of the subcarriers in the preamble, Step S944—A second value for one or more amplitudes of subcarriers in the preamble, Step S946—A second value for the subcarrier spacing of subcarriers in the preamble, Step S948—A second value for the number of subcarriers in the preamble, Step S949—A second set of indexes of transmitted subcarriers in the preamble.

In step S950 packet generation is completed with the packet being transmitted in step S960. Control then continues to step S970 where the control sequence ends.

Figure 10:
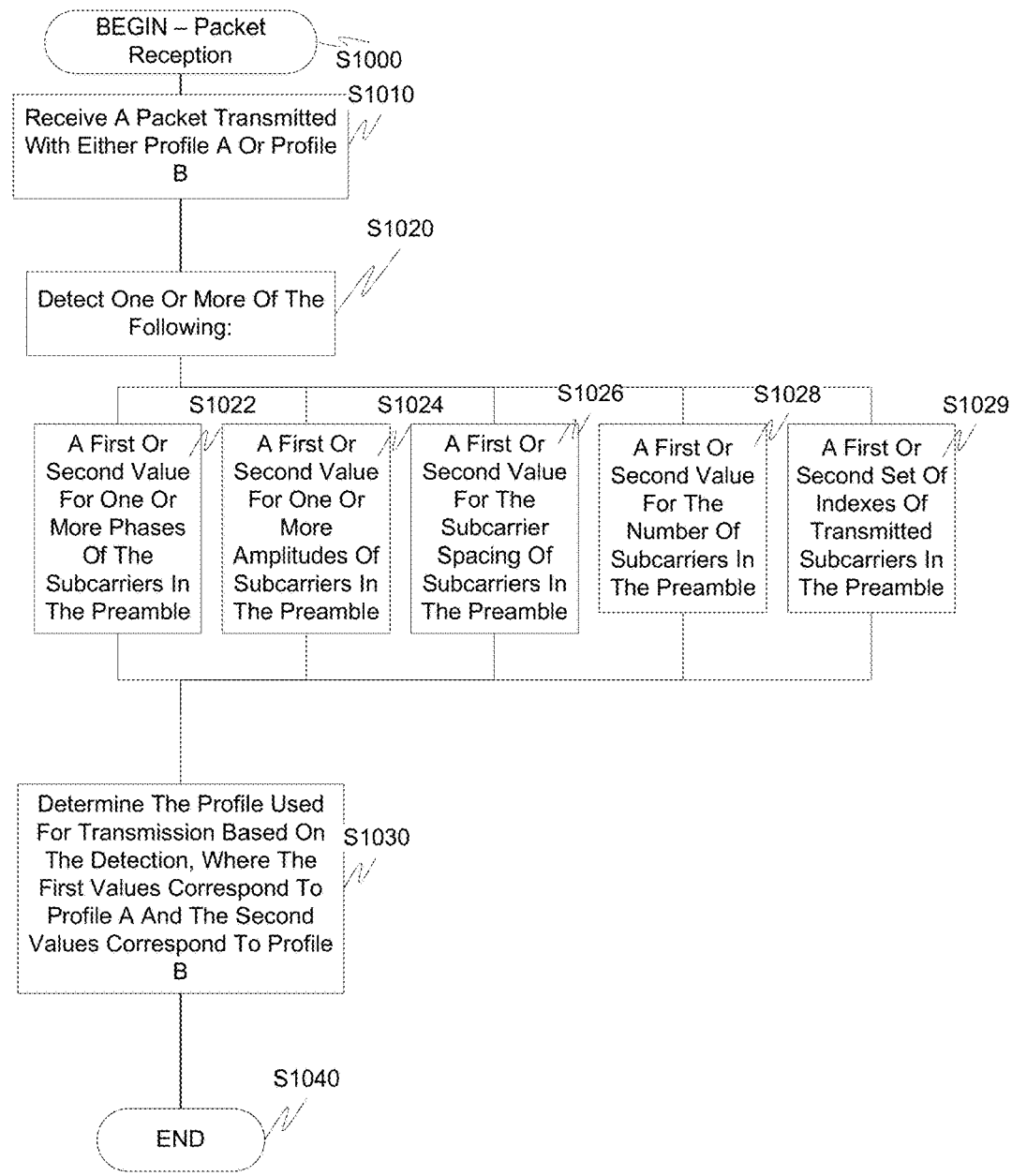
FIG. 10 is a flowchart illustrating an exemplary method for packet reception according to this invention.

FIG. 10 illustrates an exemplary method for packet reception according to an exemplary embodiment of this invention. Control begins in step S1000 and continues to Step S1010. In step S1010, a packet is received that was transmitted with either Profile A or Profile B. Next, in step S1020, the values in one or more of steps S1022-S1029 are detected:

Step S1022—A first or second value for one or more phases of the subcarriers in the preamble, Step S1024—A first or second value for one or more amplitudes of subcarriers in the preamble, Step S1026—A first or second for the subcarrier spacing of subcarriers in the preamble, Step S1027—A first or second for the number of subcarriers in the preamble, Step S1029—A first or second set of indexes of transmitted subcarriers in the preamble.

Control then continues to step S1030.

In step S1030, the profile used for transmission is determined based on the detection above, wherein the first values correspond to Profile A and the second values correspond to Profile B. Control then continues to step S1040 where the control sequence ends.

Header Identification

Another exemplary embodiment of this invention is directed towards methods that allow common sub-carrier indexing for all profiles so that, for example, a high-profile device can decode a portion of sub-carriers of a low-profile device, and a low-profile device can decode a portion of sub-carriers of a high-profile device.

For example, and again with reference to FIG. 2, C should be able to decode a portion of sub-carriers from packets that A transmits, and vice versa. This will be a prerequisite to decode each other's header information to identify the source and destination of data packets. Tone indexing determines the order in which a plurality of bits are mapped to (or loaded on) subcarriers. Therefore, common tone indexing is important for communication between devices using different profiles.

The following is one example of tone indexing based on a conventional IDFT definition.

The sub-carriers shall be indexed from i=0 to i=N−1. The sub-carriers with indexes from i=0 to i=N/2−1 shall be centered at frequencies F(i)=Fuc+Fus+i×Fsc, while those with indexes from i=N/2 to i=N−1 shall be centered at frequencies F(i)=Fuc+Fus−(N−i)×Fsc. In baseband transmission, Fuc=0, while in passband transmission, Fc=Fuc+Fus.

Based on the definition described above, the sub-carrier indexing is shown in FIG. 11. Note that sub-carrier indices in the overlapped frequency range do not match in two different profiles, which makes communication between these two profiles impossible.

Figure 12:
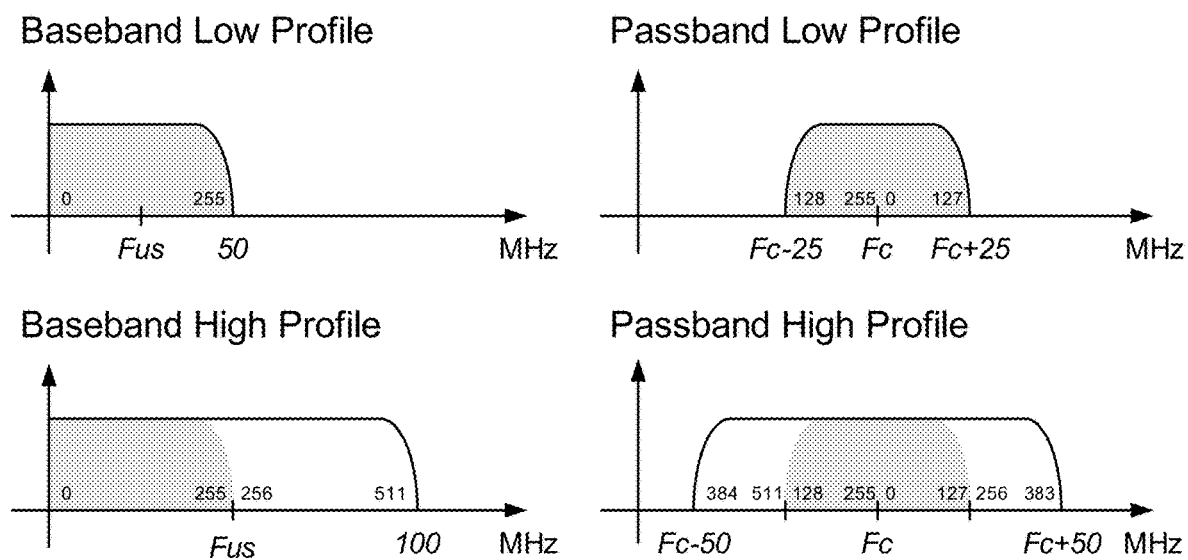
FIG. 12 illustrates examples of alternate sub-carrier indexing for different baseband and passband profiles according to this invention.

FIG. 12 shows one exemplary embodiment of alternate sub-carrier indexing which makes all sub-carrier indices in the overlapped frequency range match in these two profiles according to this invention. There can be many different ways to achieve the same goal. Of note is that sub-carrier indices in the common overlapped frequency region should match for all different profiles.

Let N=K×M where K is the number of frequency segments, which represents the maximum number of profiles, and M is the number of sub-carriers within each segment. In the example in FIG. 5, N=512, K=2, M=256.
Baseband:

$$F(i)=i\times Fsc \text{ if } i=0,\ldots,N-1$$

Passband:
For each segment k=0, 1, . . . , K−1, $$F(i)=Fc+(i-k\times M/2)\times Fsc \text{ if } i=k\times M,\ldots,k\times M+M/2-1$$

$$F(i)=Fc-(k\times 3M/2+M-i)\times Fsc \quad \text{if} \quad i=k\times M+M/2,\ldots,(k+1)\times M-1$$

where Fc=Fuc+Fus and j=i−k×M.

Figure 13:
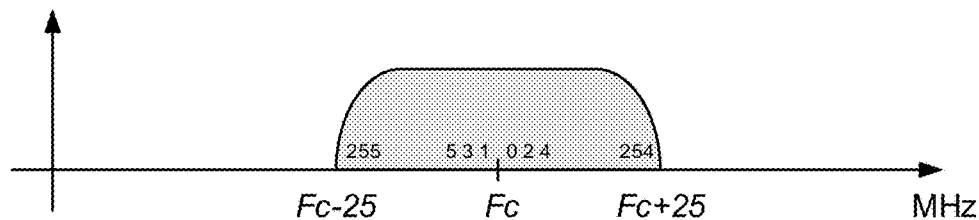
FIG. 13 illustrates another example of sub-carrier indexing for different passband profiles according to this invention.
Figure 13:
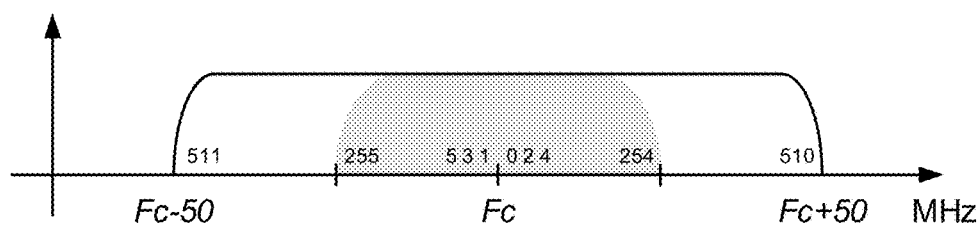

FIG. 13 shows another example of passband sub-carrier indexing which makes all sub-carrier indices in the overlapped frequency range match in multiple profiles. This approach has an exemplary advantage over the previous approach because the index increases monotonically from the center frequency to the outward direction (both left and right) which makes the scheme more scalable.
Passband:

$$F(i)=Fc+(i/2)\times Fsc \text{ if } i=0,2,4,\ldots,N-2.$$

$$F(i)=Fc-(i+1)/2\times Fsc \text{ if } i=1,3,5,\ldots,N-1.$$

where Fc=Fuc+Fus.

Figure 14:
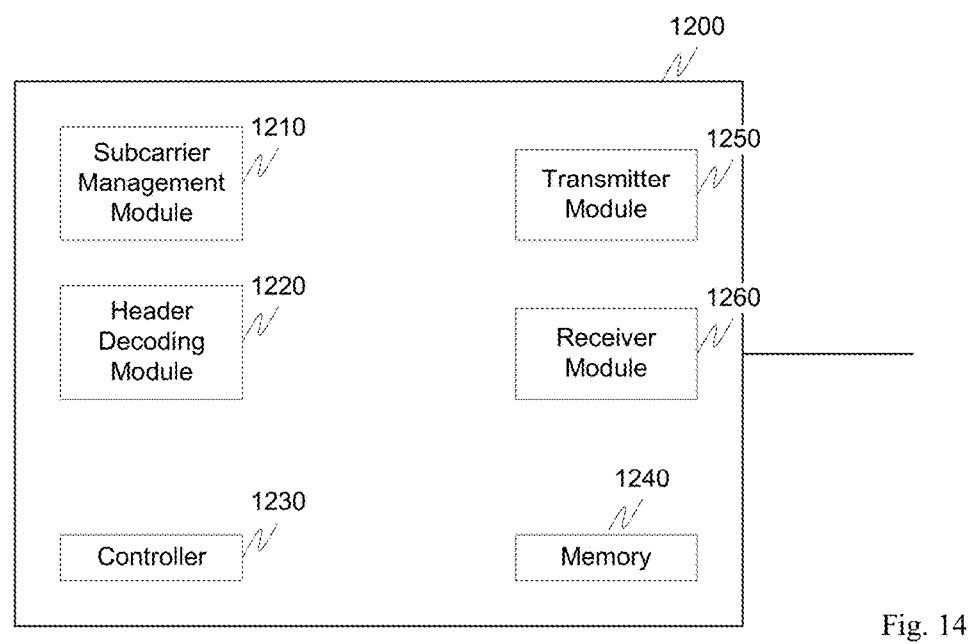
FIG. 14 illustrates an exemplary transceiver according to this invention.

FIG. 14 illustrates an exemplary transceiver 1200 that indexes subcarriers in OFDM communications according to an exemplary embodiment of this invention. Transceiver 1200 includes a subcarrier management module 1210, a header decoding module 1220, a transmitter module 1250, a receiver module 1260, controller 1230 and memory 1240, as well as other well known componentry (not shown).

In operation, the subcarrier management module 1210, cooperating with controller 1230 and memory 1240, a plurality of bits to subcarriers in a specific order, for example, as illustrated in relation to FIG. 13.

At any receiver, and in conjunction with a header decoding module, the header information can be decoded to identify the source and destination of data packets.

Figure 15:
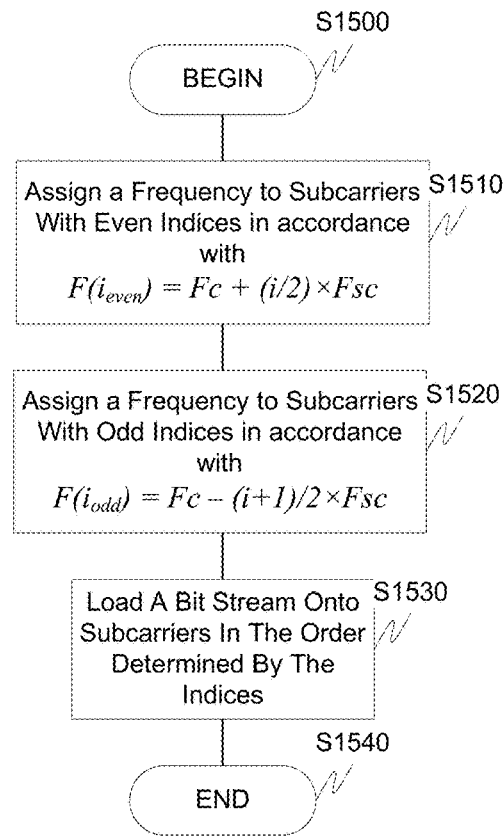
FIG. 15 is a flowchart illustrating an exemplary header identification method according to this invention.

For example, one method of indexing subcarriers for transmission in passband OFDM communications is outlined in FIG. 15.

Specifically, control begins in step S1500 and continues to step S1510. In step S1510, a frequency $F(i_{even})$ is assigned to subcarriers with even indices in accordance with:

$$F(i_{even})=Fc+(i/2)\times Fsc;$$

Next, in step S1520, a frequency $F(i_{odd})$ is assigned to subcarriers with odd indices in accordance with:

$$F(i_{odd})=Fc-(i+1)/2\times Fsc;$$

where Fc=Fuc+Fus, and wherein i is an index, Fuc is a first frequency value and Fus is a second frequency value and Fsc is third frequency value.

Then, in step S1530, a plurality of bits are loaded onto the subcarriers in an order determined by the indices. Control then continues to step S1540 where the control sequence ends.

Figure 16:
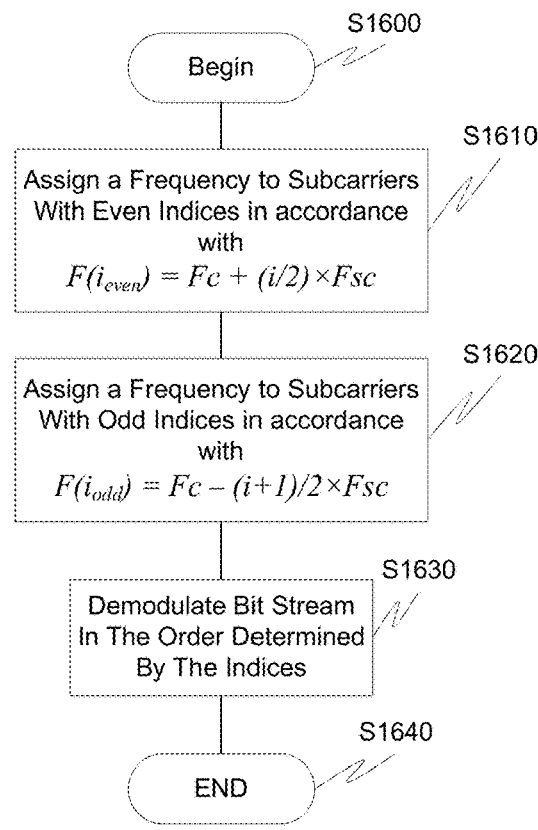
FIG. 16 is a flowchart illustrating an exemplary header identification and demodulation method according to this invention.

One exemplary method of indexing subcarriers for reception in passband OFDM communications is illustrated in FIG. 16. Specifically, control begins in step S1600 and continues to Step S1610. In step S1610, a frequency $F(i_{even})$ is assigned to subcarriers with even indices in accordance with:

$$F(i_{even})=Fc+(i/2)\times Fsc;$$

Next, in step S1620, a frequency $F(i_{odd})$ is assigned to subcarriers with odd indices in accordance with:

$$F(i_{odd})=Fc-(i+1)/2\times Fsc; \text{ where } Fc=Fuc+Fus, \text{ and}$$

wherein i is an index, Fuc is a first frequency value and Fus is a second frequency value and Fsc is third frequency value.

Then, in step S1630, a plurality of bits from the subcarriers is demodulated in an order determined by the indices. Control then continues to step S1640 where the control sequence ends.

Figure 17:
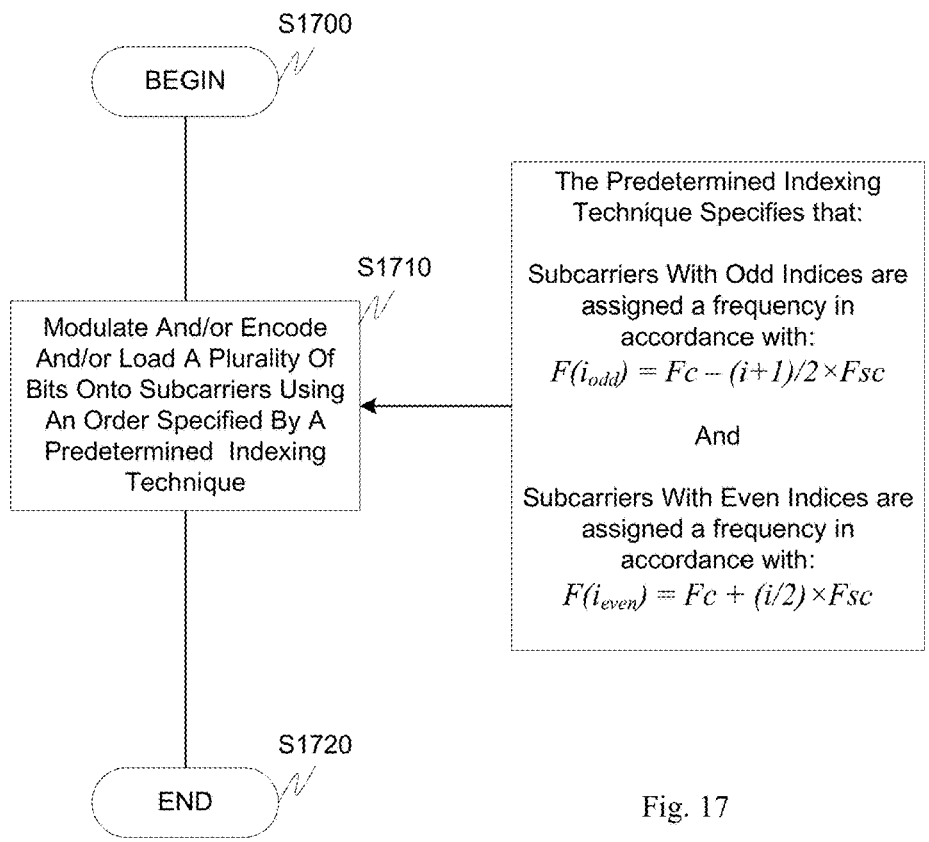
FIG. 17 is a flowchart illustrating another exemplary header identification method according to this invention.

Another exemplary method of indexing subcarriers for transmission in passband OFDM communications is outlined in FIG. 17.

Specifically, control begins in step S1700 and continues to step S1710. In step S1710, bits are modulated and/or encoded and/or loaded onto subcarriers in an order specified by a predetermined indexing technique. The predetermined indexing technique specifies that:
a frequency $F(i_{even})$ is assigned to subcarriers with even indices in accordance with:

$$F(i_{even})=Fc+(i/2)\times Fsc; \text{ and,}$$

a frequency $F(i_{odd})$ is assigned to subcarriers with odd indices in accordance with:

$$F(i_{odd})=Fc-(i+1)/2\times Fsc;$$

where Fc=Fuc+Fus, and wherein i is an index, Fuc is a first frequency value and Fus is a second frequency value and Fsc is third frequency value. Control then continues to step S1720 where the control sequence ends.

Figure 18:
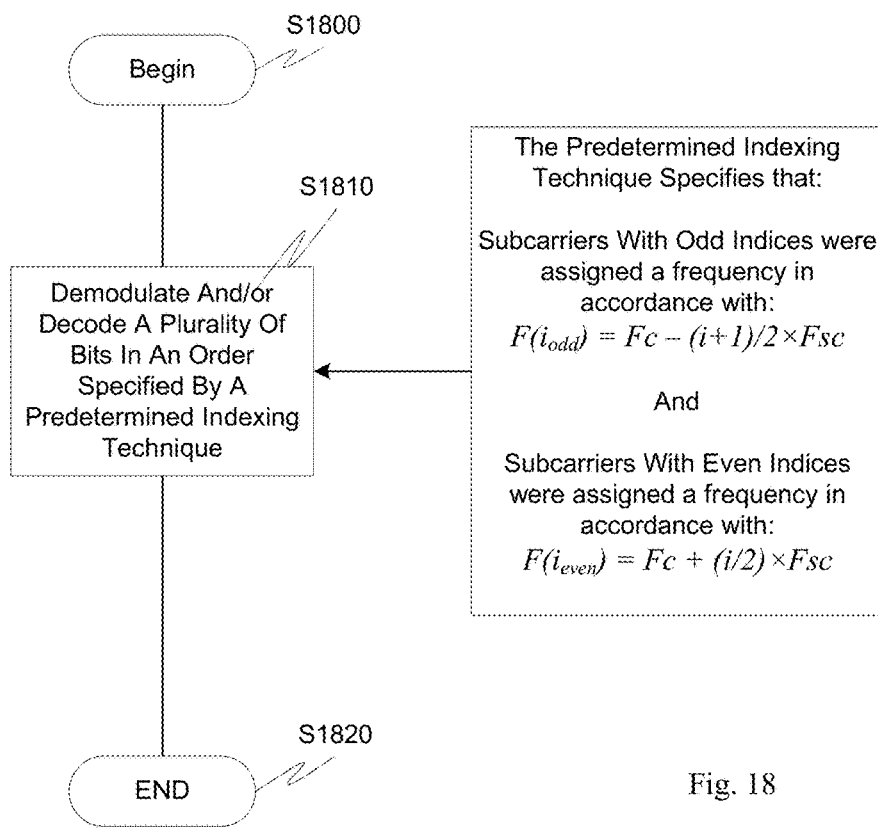
FIG. 18 is a flowchart illustrating another exemplary header identification and demodulation method according to this invention.

Another exemplary method of indexing subcarriers for reception in passband OFDM communications is illustrated in FIG. 18. Specifically, control begins in step S1800 and continues to Step S1810.

In step S1810, a plurality of bits from the subcarriers is demodulated and/or decoded in an order specified by a predetermined indexing technique. The predetermined indexing technique specifies that:
a frequency $F(i_{even})$ is assigned to subcarriers with even indices in accordance with:

$$F(i_{even})=Fc+(i/2)\times Fsc;$$

a frequency $F(i_{odd})$ is assigned to subcarriers with odd indices in accordance with:

$$F(i_{odd})=Fc-(i+1)/2 \times Fsc; \text{ where } Fc=Fuc+Fus,$$

wherein i is an index, Fuc is a first frequency value and Fus is a second frequency value and Fsc is third frequency value.

Control then continues to step S1820 where the control sequence ends.

Header Decodability Enhancements

Yet another exemplary embodiment of this invention is directed toward methods to enhance decodability of the header via sub-carrier redistribution. These techniques can be used independently from or in conjunction with the aforementioned methods. However, these methods can also be used as a complementary means to, for example, mitigate the side-effect of passband sub-carrier indexing shown in FIG. 13 as well as to provide the receiver a better chance to estimate the channel.

As illustrated in FIG. 4, the conventional preamble design uses the larger sub-carrier spacing than the header or the payload in order to reduce the overhead (i.e., k1, k2>1). This in result makes the receiver design complicated because the channel response for sub-carriers which do not carry preamble signals ("non-preamble tones") can be only obtained from neighboring sub-carriers which carry preamble signals ("preamble tones"). Therefore, the SNR for non-preamble tones is lower than the SNR for preamble tones. Based on the preamble, the channel should be accurately estimated for all sub-carriers since the header and the payload utilize all sub-carriers to carry information.

Figure 19:
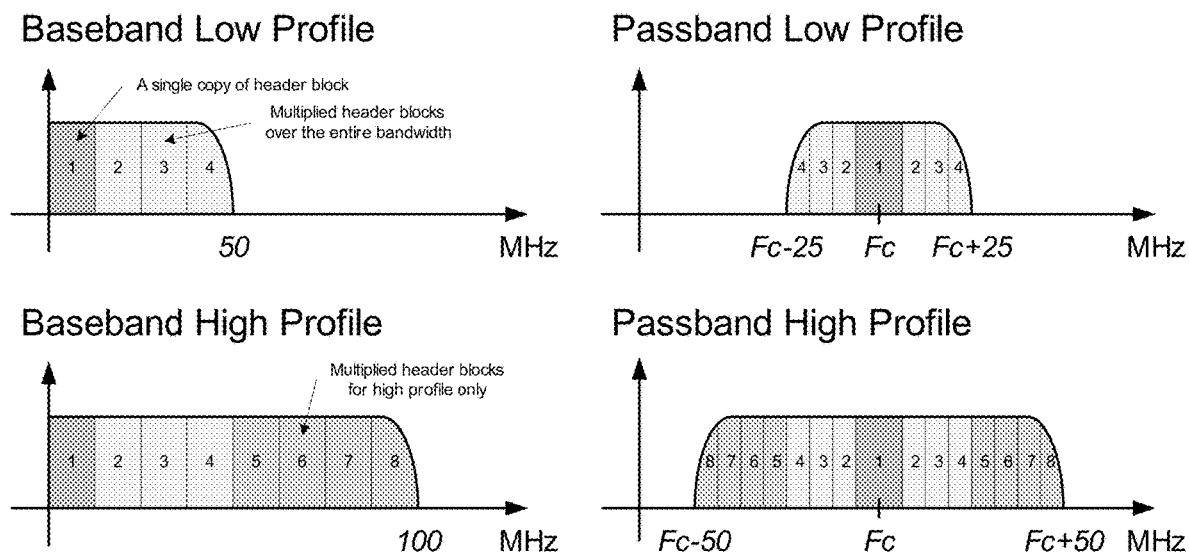
FIG. 19 illustrates examples of header repetition schemes used in baseband and passband profiles.

The conventional header design often contains multiple copies of the fixed (and often small) number of header information bits (header block) within a given bandwidth in order to increase frequency diversity. This is usually the case because the number of the header information bits is relatively small, and header information is often carried over one or more OFDM symbols which have much higher capacity. It is shown in FIG. 19 that low profile and high profile contains the same amount of header information, but different number of copies of the header blocks. That is, a low-profile device decoding only a portion of sub-carriers still can decode the full header information even though with decreased frequency diversity.

The indexing rules shown in FIGS. 12 and 13 are used for baseband and passband profiles, respectively.

If a certain portion of header information always ends up being loaded on non-preamble tones, then it can degrade decodability of the entire header. In order to avoid such a case, one exemplary embodiment provides various sub-carrier redistribution methods for the header as a single header block is repeated multiple times over the entire bandwidth. This will guarantee that header information is evenly distributed between preamble and non-preamble tones.

Conventional Header Repetition Scheme

Assume that the header information bits will be encoded with r-rate FEC and modulated with M-bit constellation. The encoder output will be repeated multiple times to fill out one or more OFDM symbols and mapped to sub-carriers. That is, KH header information bits are encoded to NH FEC codeword (NH=1/r×KH), and the 1st through Mth bits are loaded on the first tone, and the (M+1)th through (2 M)th bits are loaded on the second tone, and so on. The tone block which corresponds to a single set of the header information will be referred to as the "header tone block" and the tone index within each block as the "header tone index."

Figure 11:
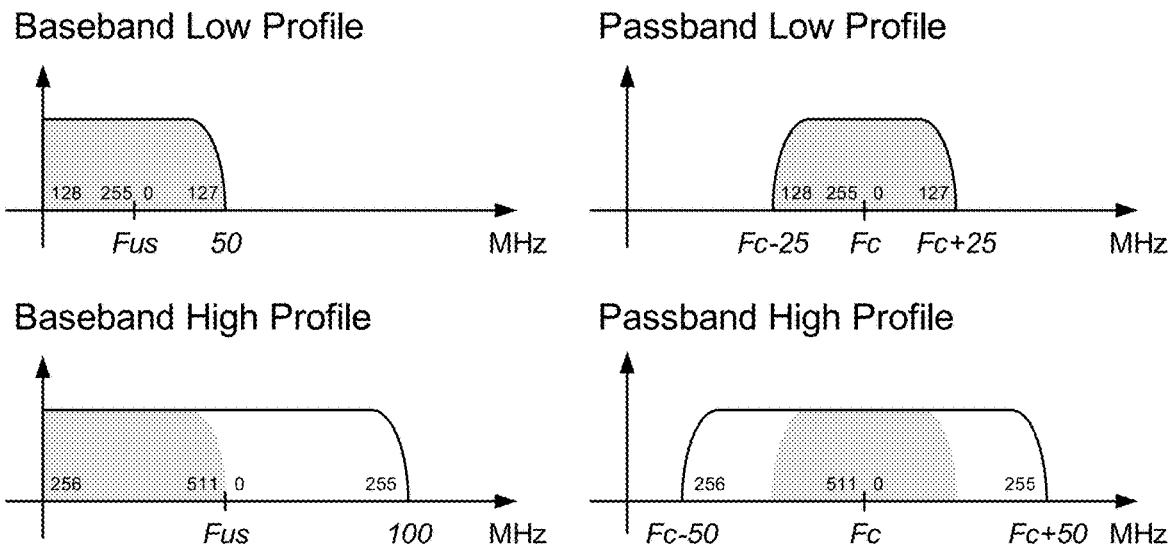
FIG. 11 illustrates examples of sub-carrier indexing for different baseband and passband profiles based on an IDFT definition.

For the purpose of illustration, the following parameters are used:

Maximum number of subcarriers: N=2048.
Preamble structure: two-section preamble as described in § 4.3.2.
Tone spacing for preamble: Fsc preamble=8×Fsc.
For baseband bandplan, preamble tones are located at (k×Fsc preamble) where k=4, 12, 20, . . . , 2044 (total of 256 tones).
For RF bandplan, preamble tones are located at (Fc+k× Fsc preamble) where k=±4, ±12, ±20, . . . , ±1020 (total of 256 tones).
Header information block size: KH=168.
½-rate FEC with QPSK modulation (r=½, M=2).
FEC Encoded Header information block size=168×2=336
Tone spacing for the header: Fsc_header=FSC.
One OFDM symbol for the header.
Baseband sub-carrier indexing (FIG. 10) and Passband sub-carrier indexing (FIG. 11).

For this case, a single set of header information (168 bits) will be FEC encoded with the r=1/2 code resulting in an FEC encoded header information block size of 336 at the output of the FEC encoder. These 336 FEC encoded bits (or FEC bits) will be mapped to 168 sub-carriers with each bit modulating 2 bits (M=2). Since there are a total of 2048 tones in a given bandwidth, header information will be repeated a little more than 12 times over the entire bandwidth in one OFDM symbol provided that all sub-carriers are active. For all sub-carriers i=0, . . . , 2047, each header tone block would be mapped as {0, 1, 2, . . . , 167}, {0, 1, 2, . . . , 167}, . . . .

Figure 20:
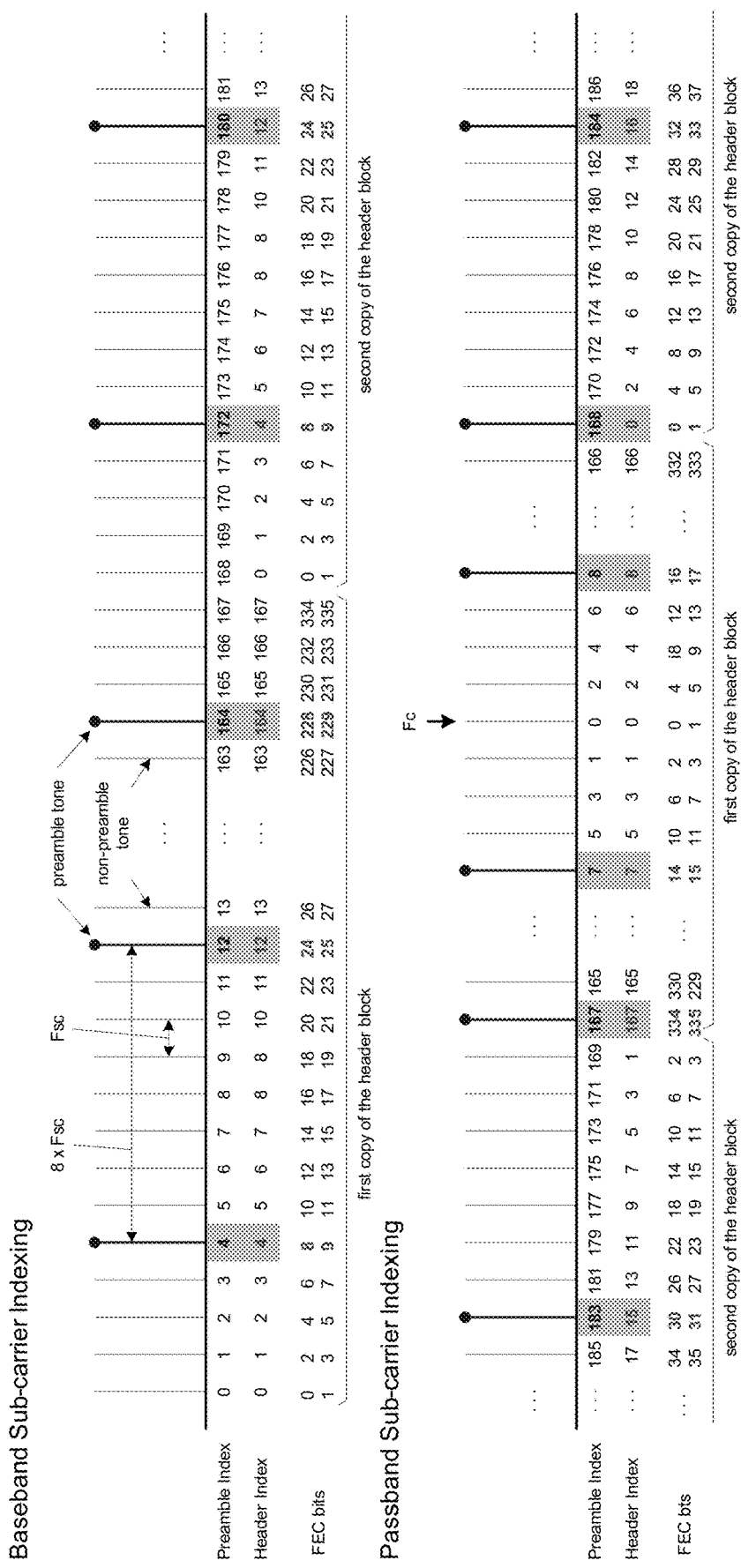
FIG. 20 illustrates an exemplary header repetition scheme.
Figure 21:
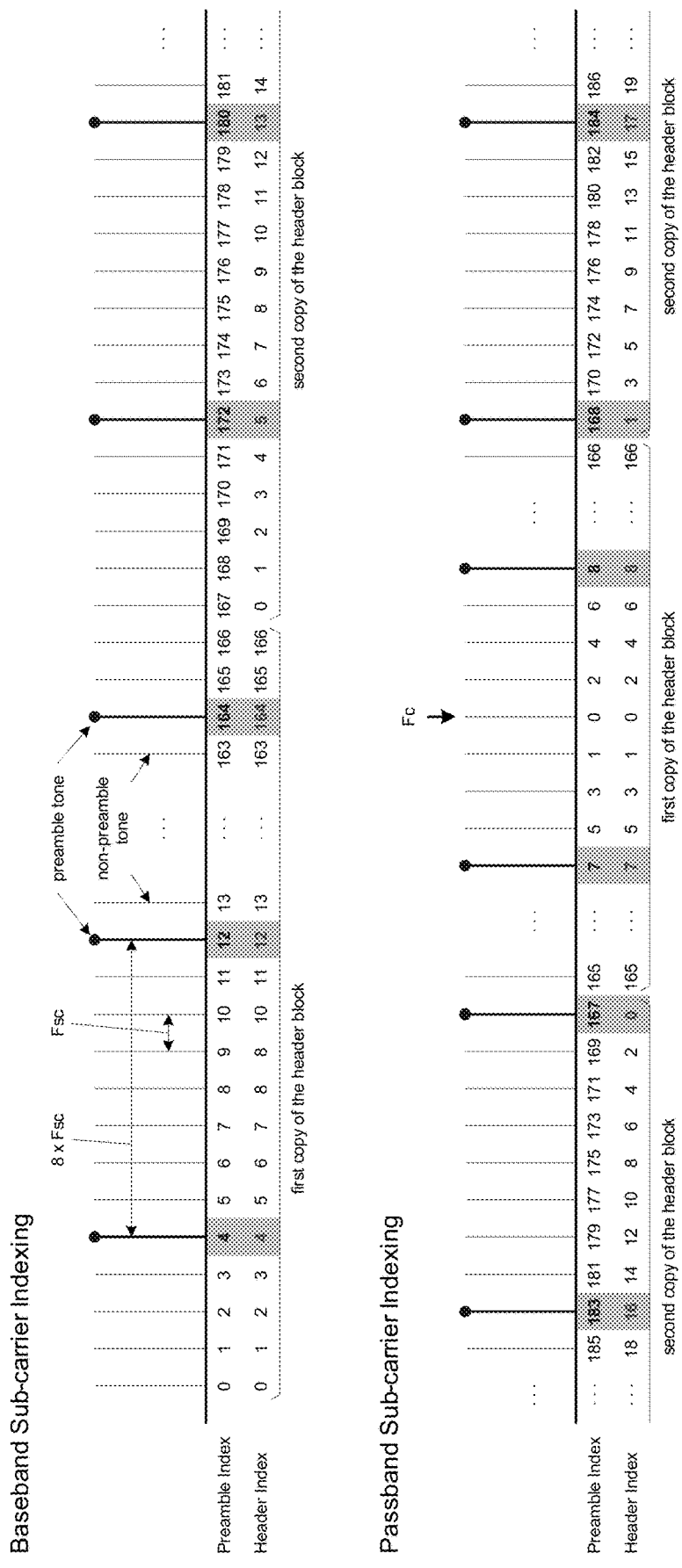
FIG. 21 illustrates an exemplary header repetition scheme with odd header information block size.

FIG. 20 illustrates how each sub-carrier in the header block is mapped to the actual frequency in the conventional header repetition scheme.

There are at least two exemplary problems with this repetition scheme:

1. In the baseband case, it can be easily seen that the preamble tones always carry a certain portion of header information. That is, 4th, 12th, . . . , 164th header indices, corresponding to FEC bit pairs (8,9), (24,25 and (228,229) respectively, are always carried on preamble tones, whereas the rest of the FEC bits are always carried on non-preamble tones. A similar thing happens in the passband case. This is because the number of header information bits is a multiple of 8 (ratio of the number of non-preamble tones over the number of preamble tones in a given bandwidth). This is not desirable because the performance of the header can be limited by information carried on non-preamble tones.

2. In the passband case, the header information corresponding to even header tone indices always end up being on the right-half of the center frequency, and likewise odd header tone indices on the left-half. This is a side effect of alternating odd-even tone indexing scheme.

Enhanced Header Repetition Schemes
Circular Shifting Sub-Carriers within Each Header Block One exemplary technique is to change tone mapping as a copy of the header block is repeated over the entire bandwidth. For example, as each block of header information is repeated, a circular shift can be performed on the FEC codeword bits or the header indices. For instance, each header tone block can be mapped as such that the header index follows the following pattern: {0, 1, . . . , 166, 167}, {1, 2, . . . , 167, 0}, {2, 3, . . . , 167, 0, 1}, . . . for all sub-carriers i=0, . . . , 2047. Equivalently, the FEC encoder output can be circular-shifted by 2 bits after each consecutive codeword is concatenated together. Note that the outcome of this approach is similar to that of the previous approach.

Figure 22:
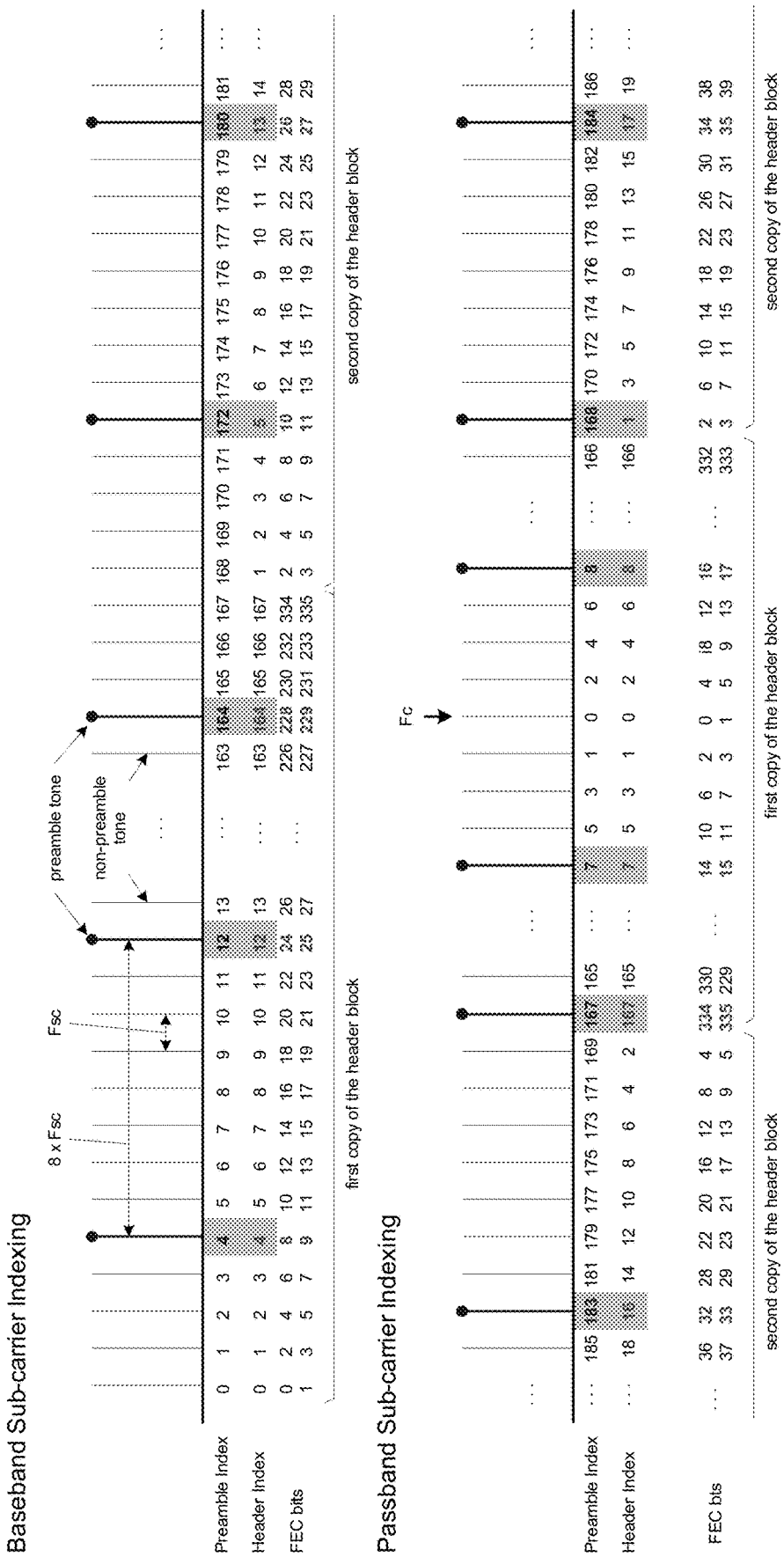
FIG. 22 illustrates an exemplary header repetition scheme utilizing tone shifting.

FIG. 22 shows how pairs of FEC encoded bits are mapped to subcarriers. Note that different encoded bits are loaded on preamble tones for the second copy of header block. More specifically, a first set of bits from the first copy of the FEC codeword is modulated on a first set of preamble subcarriers and a second different set of bits from the second copy of the FEC codeword is modulated on a second set of preamble subcarriers. This is a result of the cyclically shifting of bits of FEC Encoded Header information block.

Also for the passband case, even and odd indices are evenly allocated around the center frequency.

Figure 23:
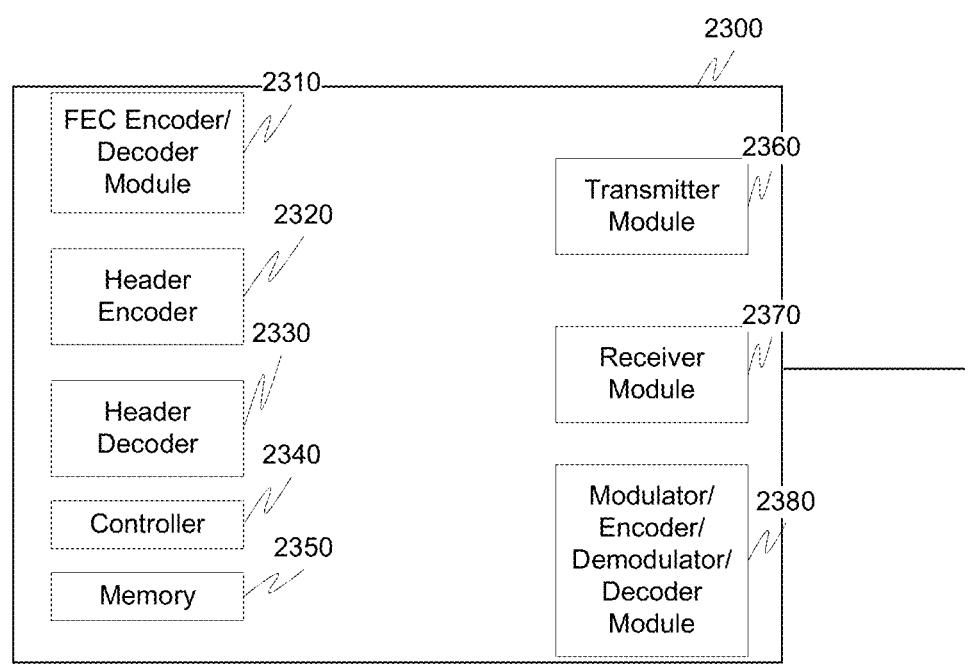
FIG. 23 illustrates another exemplary communication system according to this invention.

FIG. 23 illustrates an example of a transceiver 2300 capable of performing the enhanced header techniques disclosed herein. The transceiver 2300 comprises an FEC Encoder/Decoder 2310, a header encoder 2320, a header decoder 2330, controller 2340, memory 2350, a transmitter module 2360, and a receiver module 2370 and a modulator/encoder/demodulator/decoder module 2380, in addition to other well known components (not shown).

In one exemplary transmitter embodiment, a header is encoded for multicarrier communications in accordance with the following technique. Specifically, the FEC encoder 2310 encodes a plurality of bits using a forward error correction code and generates an FEC codeword comprising a plurality of encoded bits. The header encoder 2330 concatenates at least a first copy of the FEC codeword with at least a second copy of the FEC codeword and wherein the concatenating comprises cyclically shifting by two bits the second concatenated copy of the FEC codeword relative to the first concatenated copy of the FEC codeword. The modulating module 2380 then modulates first and second copies of the FEC codewords on at least one OFDM symbol for transmission by the transmitter module 2360.

In another exemplary transmitter embodiment, a header is encoded for multicarrier communications in accordance with the following technique. Specifically, the FEC encoder 2310 encodes a plurality of bits using a forward error correction code and generates an FEC codeword comprising a plurality of encoded bits. The header encoder 2320 concatenates a plurality of copies of the FEC codeword wherein the concatenating comprises cyclically shifting by two bits at least one concatenated copy of the FEC codeword relative to a previous concatenated copy of the FEC codeword. The modulating module 2380 then modulates the plurality of copies of the FEC codewords on at least one OFDM symbol for transmission by the transmitter module 2360.

In one exemplary receiver embodiment, the header is decoded in accordance with the following exemplary technique. The transceiver 2300 receives, with the cooperation of the receiver module 2370, a plurality of encoded bits comprising at least two concatenated copies of an FEC codeword. The FEC decoder 2310 decodes a first copy of the FEC codeword from the plurality of encoded bits to generate a first plurality of decoded bits. The FEC decoder 2310 decodes a second copy of the FEC codeword from the plurality of encoded bits to generate a second plurality of decoded bits, wherein the decoding comprises cyclically shifting by two bits the second copy of the FEC codeword relative to the first copy of the FEC codeword.

In another exemplary receiver embodiment, the header is decoded in accordance with the following exemplary technique. The transceiver 2300 receives, with the cooperation of the receiver module 2370, a plurality of encoded bits comprising a plurality of concatenated copies of an FEC codeword. The FEC decoder 2310 decodes at least two of the plurality of the concatenated copies of the FEC codeword wherein the decoding comprises cyclically shifting by two bits at least one concatenated copy of the FEC codeword relative to a previous concatenated copy of the FEC codeword.

Figures 24, 25:
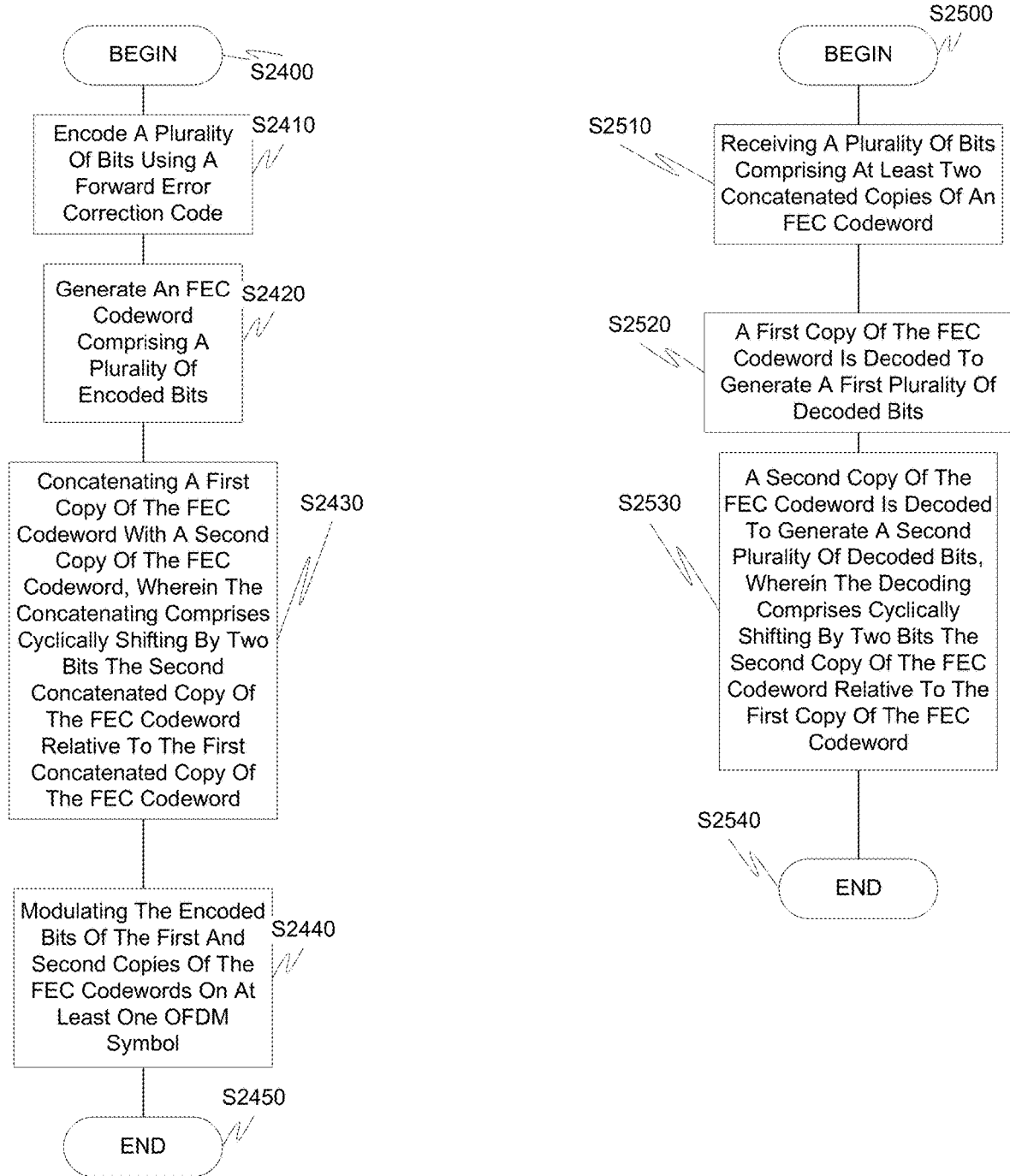
FIG. 24 is a flowchart illustrating an exemplary method for enhanced header techniques according to this invention.
FIG. 25 is a flowchart illustrating another exemplary method for enhanced header techniques according to this invention.

FIGS. 24 and 25 illustrate exemplary methods for header encoding and header decoding, respectively, according to an exemplary embodiment of this invention.

In FIG. 24, control for header encoding in multicarrier communications commences in step S2400 and continues to step S2410. In step S2410, a plurality of bits are encoded using a forward error correction code. Next, in step S2420, an FEC codeword is generated comprising a plurality of encoded bits. Then, in step S2430, a first copy of the FEC codeword is concatenated with a second copy of the FEC codeword wherein the concatenating comprises cyclically shifting by two bits the second concatenated copy of the FEC codeword relative to the first concatenated copy of the FEC codeword. Next, in step S2440, the encoded bits of the first and second copies of the FEC codewords are modulated on at least one OFDM symbol. Control then continues to step S2450 where the control sequence ends.

In FIG. 25, control begins in step S2500 and continues to step S2510. In step S2510, a plurality of encoded bits comprising at least two concatenated copies of an FEC codeword is received. Next, in step S2520, a first copy of the FEC codeword is decoded to generate a first plurality of decoded bits. Next, in step S2530, a second copy of the FEC codeword is decoded to generate a second plurality of decoded bits, wherein the decoding comprises cyclically shifting by two bits the second copy of the FEC codeword relative to the first copy of the FEC codeword. Control then continues to step S2540 where the control sequence ends.

Figures 26, 27:
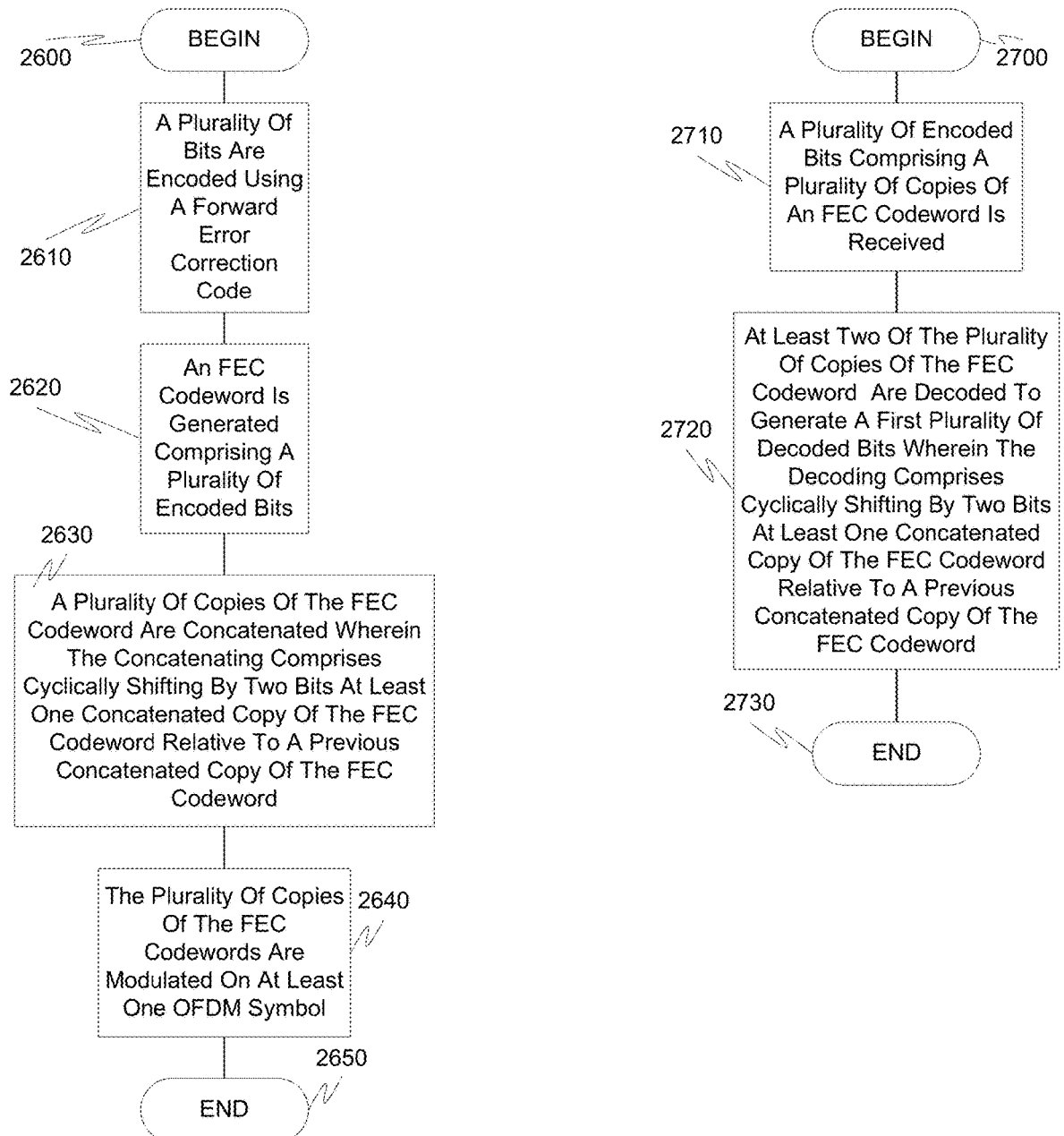
FIGS. 26 and 27 are flowcharts illustrating exemplary methods for header encoding and header decoding, respectively, according to another exemplary embodiment of this invention.

FIGS. 26 and 27 illustrate exemplary methods for header encoding and header decoding, respectively, according to another exemplary embodiment of this invention.

In FIG. 26, control for header encoding in multicarrier communications commences in step S2600 and continues to step S2610. In step S2610, a plurality of bits are encoded using a forward error correction code. Next, in step S2620, an FEC codeword is generated comprising a plurality of encoded bits. Then, in step S2630, a plurality of copies of the FEC codeword are concatenated wherein the concatenating comprises cyclically shifting by two bits at least one concatenated copy of the FEC codeword relative to a previous concatenated copy of the FEC codeword. Next, in step S2640, the plurality of copies of the FEC codewords are modulated on at least one OFDM symbol. Control then continues to step S2450 where the control sequence ends.

In FIG. 27, control begins in step S2700 and continues to step S2710. In step S2710, a plurality of encoded bits comprising a plurality of copies of an FEC codeword is received. Next, in step S2720, at least two of the plurality of copies of the FEC codeword are decoded to generate a first plurality of decoded bits wherein the decoding comprises cyclically shifting by two bits at least one concatenated copy of the FEC codeword relative to a previous concatenated copy of the FEC codeword. Control then continues to step S2730 where the control sequence ends.

Figure 28:
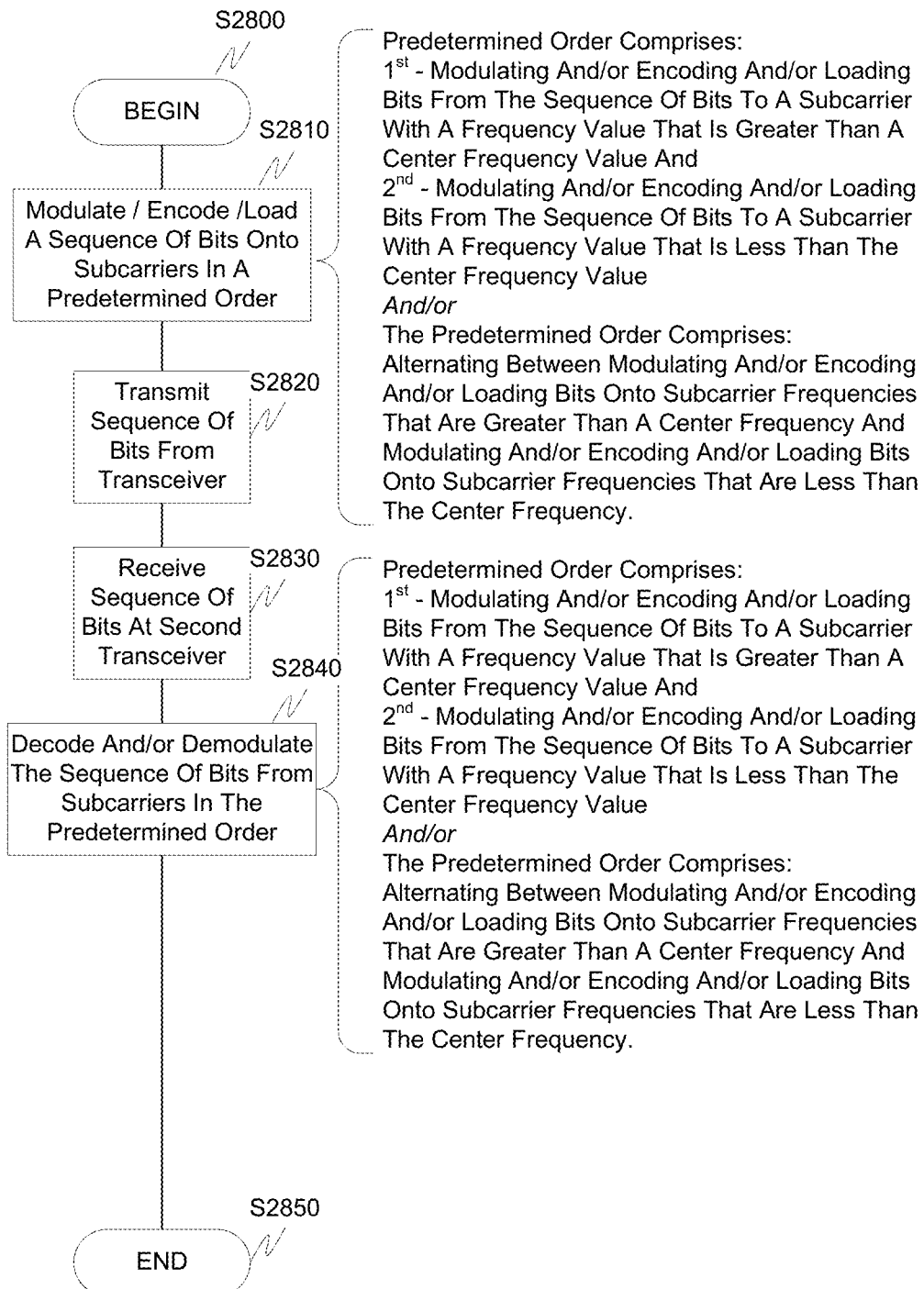
FIG. 28 illustrates another exemplary method of passband OFDM communications according to this invention.

FIG. 28 illustrates another exemplary method of passband communications according to this invention. Control begins in step S2800 and continues to step S2810. In step S2810, a sequence of bits are modulated and/or encoded and/or loaded onto subcarriers in a predetermined order, wherein the predetermined order includes:

first modulating and/or encoding and/or loading bits from the sequence of bits to a subcarrier with a frequency value that is greater than a center frequency value, and second modulating and/or encoding and/or loading bits from the sequence of bits to a subcarrier with a frequency value that is less than the center frequency value. Alternatively, or in addition, the sequence of bits are modulated and/or encoded and/or loaded onto subcarriers in a predetermined order, wherein the predetermined order comprises alternating between modulating and/or encoding and/or loading bits onto subcarrier frequencies that are greater than a center frequency and modulating and/or encoding and/or loading bits onto subcarrier frequencies that are less than the center frequency. The subcarrier frequency value can be greater than the center frequency value is Fc+n×Fsc and the subcarrier frequency value that is less than the center frequency is Fc−n×Fsc, wherein Fc is the value of center frequency in Hz and, Fsc is a value for subcarrier spacing in Hz, and n is an integer. Next, in step S2820, the sequence of bits is transmitted from a first transceiver. Control then continues to step S2830.

In step S2830, the sequence of bits are received at a second transceiver. Next, in step S2840, the sequence of bits are decoded and/or demodulated from subcarriers in an predetermined order, wherein the predetermined order comprises first decoding and/or demodulating bits from the sequence of bits from a subcarrier with a frequency value that is greater than a center frequency value and second decoding and/or demodulating bits from the sequence bits from a subcarrier with a frequency value that is less than the center frequency value. The subcarrier frequency value that is greater than the center frequency value is Fc+n×Fsc, and wherein the subcarrier frequency value that is less than the center frequency is Fc−n×Fsc, wherein Fc is the value of center frequency in Hz and, Fsc is a value for subcarrier spacing in Hz, and n is an integer. Alternatively or in addition, the sequence of bits can be decoded and/or demodulated from subcarriers in a predetermined order, wherein the predetermined order comprises alternating between decoding and/or demodulating bits from subcarrier frequencies that are greater than a center frequency and decoding and/or demodulating bits from subcarrier frequencies that are less than the center frequency. Control then continues to step S2850 where the control sequence ends.

The above-described methods and systems and can be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug® or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention. While the systems and means disclosed herein are described in relation to various functions that are performed, it is to be appreciated that the systems and means may not always perform all of the various functions, but are capable of performing one or more of the disclosed functions.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a computer-readable medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of communication device.

While the invention is described in terms of exemplary embodiments, it should be appreciated that individual aspects of the invention could be separately claimed and one or more of the features of the various embodiments can be combined.

While the systems and means disclosed herein are described in relation to various functions that are performed, it is to be appreciated that the systems and means may not always perform all of the various functions, but are capable of performing one or more of the disclosed functions.

While the exemplary embodiments illustrated herein disclose the various components as collocated, it is to be appreciated that the various components of the system can be located at distant portions of a distributed network, such as a telecommunications network and/or the Internet or within a dedicated communications network. Thus, it should be appreciated that the components of the system can be combined into one or more devices or collocated on a particular node of a distributed network, such as a telecommunications network. As will be appreciated from the following description, and for reasons of computational efficiency, the components of the communications network can be arranged at any location within the distributed network without affecting the operation of the system.

It is therefore apparent that there has been provided, in accordance with the present invention, systems and methods for PSD management. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A wireless Orthogonal Frequency Division Multiplexing (OFDM) transceiver comprising: a transmitter portion, that cooperates with a controller and memory, capable of generating a packet comprising a preamble portion and a header portion wherein a sub-carrier spacing of a section of the preamble portion is greater than the sub-carrier spacing of the header portion; the transmitter portion further of capable of encoding a plurality of bits using a Forward Error Correction (FEC) encoder to generate a FEC codeword comprising a plurality of encoded bits; and the transmitter portion further capable of concatenating a first copy of the FEC codeword with a second copy of the FEC codeword, wherein the concatenating comprises cyclically shifting by two bits the second concatenated copy of the FEC codeword relative to the first concatenated copy of the FEC codeword.

2. The wireless OFDM transmitter of claim 1, further capable of modulating the encoded bits of the first and second copies of the FEC codewords on at least one OFDM symbol.

3. The method of claim 1, further comprising modulating the encoded bits of the first and second copies of the FEC codewords on at least one OFDM symbol.

4. A method, in a wireless Orthogonal Frequency Division Multiplexing (OFDM) transmitter, the method comprising: generating a packet comprising a preamble portion and a header portion, wherein a sub-carrier spacing of a section of the preamble portion is greater than the sub-carrier spacing of the header portion; encoding a plurality of bits using a Forward Error Correction (FEC) encoder to generate a FEC codeword comprising a plurality of encoded bits; and concatenating a first copy of the FEC codeword with a second copy of the FEC codeword, wherein the concatenating comprises cyclically shifting by two bits the second concatenated copy of the FEC codeword relative to the first concatenated copy of the FEC codeword.

5. A non-transitory computer-readable information storage media having stored thereon instructions, that when executed by one or more processors, cause to be performed a method, in a wireless Orthogonal Frequency Division Multiplexing (OFDM) transceiver, the method comprising:
generating a packet comprising a preamble portion and a header portion, wherein a sub-carrier spacing of a section of the preamble portion is greater than the sub-carrier spacing of the header portion;
encoding a plurality of bits using a Forward Error Correction (FEC) encoder to generate a FEC codeword comprising a plurality of encoded bits; and concatenating a first copy of the FEC codeword with a second copy of the FEC codeword, wherein the concatenating comprises cyclically shifting by two bits the second concatenated copy of the FEC codeword relative to the first concatenated copy of the FEC codeword.

6. The media of claim 5, further comprising modulating the encoded bits of the first and second copies of the FEC codewords on at least one OFDM symbol.

* * * * *